United States Patent
Soldati et al.

(10) Patent No.: US 12,294,552 B2
(45) Date of Patent: May 6, 2025

(54) METHOD AND DEVICE FOR PROVIDING RESOURCE STATUS INFORMATION

(71) Applicant: Telefonaktiebolaget LM Ericsson (publ), Stockholm (SE)

(72) Inventors: Pablo Soldati, Solna (SE); Angelo Centonza, Granada (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 484 days.

(21) Appl. No.: 17/764,719

(22) PCT Filed: Oct. 2, 2020

(86) PCT No.: PCT/SE2020/050936
§ 371 (c)(1),
(2) Date: Mar. 29, 2022

(87) PCT Pub. No.: WO2021/066729
PCT Pub. Date: Apr. 8, 2021

(65) Prior Publication Data
US 2023/0020284 A1    Jan. 19, 2023

Related U.S. Application Data

(60) Provisional application No. 62/910,000, filed on Oct. 3, 2019, provisional application No. 62/910,022, filed on Oct. 3, 2019.

(51) Int. Cl.
*H04L 5/00* (2006.01)
(52) U.S. Cl.
CPC .................... *H04L 5/0091* (2013.01)
(58) Field of Classification Search
CPC .................................................. H04L 5/0091
See application file for complete search history.

(56) References Cited

U.S. PATENT DOCUMENTS

2005/0026616 A1*  2/2005  Cavalli ............ H04W 36/0085
                                                                    455/439
2012/0314569 A1* 12/2012  Liu .................... H04W 36/304
                                                                    370/252
(Continued)

FOREIGN PATENT DOCUMENTS

WO     2018164431 A1    9/2018

OTHER PUBLICATIONS

3GPP, "3rd Generation Partnership Project; Technical Specification Group Services and System Aspects; Telecommunication management; Self-Organizing Networks (SON) Policy Network Resource Model (NRM) Integration Reference Point (IRP); Information Service (IS)", 3GPP TS 32.522 V11.7.0, Sep. 2013, 1-58.
(Continued)

*Primary Examiner* — Fahmida S Chowdhury
(74) *Attorney, Agent, or Firm* — Murphy, Bilak & Homiller, PLLC

(57) ABSTRACT

The present disclosure relates to telecommunications. In one of its aspects, the disclosure concerns a method, performed by a first network node, for providing resource status information to a second network node. The first network node controls a radio cell comprising a plurality of partitions. The method comprises determining a resource status information based on a ratio between a resource status associated to the radio cell and a resource status associated to at least one partition of the radio cell. The method further comprises transmitting, to the second network node, a resource status update message comprising at least one information element comprising the determined resource status information.

16 Claims, 12 Drawing Sheets

(56) References Cited

U.S. PATENT DOCUMENTS

| | | | | |
|---|---|---|---|---|
| 2013/0194950 A1* | 8/2013 | Haghighat | ............ | H04L 5/0035 370/252 |
| 2014/0056240 A1* | 2/2014 | Zhuang | ................ | H04W 76/10 370/329 |
| 2017/0366994 A1* | 12/2017 | Akkarakaran | ........ | H04L 5/0092 |
| 2018/0110017 A1* | 4/2018 | Jha | ........................ | H04L 1/0011 |
| 2018/0324663 A1* | 11/2018 | Park | ...................... | H04W 36/22 |
| 2021/0083821 A1* | 3/2021 | Park | ...................... | H04W 16/28 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.7.0, Sep. 2019, 1-962.
3GPP, "3rd Generation Partnership Project; Technical Specification Group Radio Access Network; Evolved Universal Terrestrial Radio Access Network (E-Utran); X2 application protocol (X2AP) (Release 15)", 3GPP TS 36.423 V15.7.0, Sep. 2019, 1-422.
Ericsson, et al., "Per SSB load reporting for load balancing in NG RAN", 3GPP TSG-RAN WG3 #105, R3-194541, Ljubljana, SI, Aug. 26-Aug. 30, 2019, 1-4.

* cited by examiner

METHOD AND DEVICE FOR PROVIDING RESOURCE STATUS INFORMATION

TECHNICAL FIELD

The present disclosure generally relates to telecommunications, and embodiments herein relate to a first network node and a User Equipment (UE) and methods performed therein. In particular, the various embodiments described in this disclosure relate to a first network node and a method for providing resource status information, and to a UE and a method for receiving information indicating a radio cell to connect to.

BACKGROUND

Synchronization Signals and PBCH Blocks (SSB)

The 3GPP New Radio (NR) system enables a radio cell to be configured to transmit multiple Synchronization Signals and PBCH Blocks (SSB) for the purpose of cell search and synchronization. An SSB consists of a primary and secondary synchronization signals (PSS, SSS), each occupying 1 symbol and 127 subcarriers, and a Physical Broadcast Channel (PBCH) signal spanning across 3 orthogonal frequency-division multiplexing (OFDM) symbols and 240 subcarriers, but on one symbol leaving an unused part in the middle for SSS.

The possible time locations of SSBs, within a half-frame, are determined by sub-carrier spacing and the periodicity of the half-frames where SSBs are transmitted is configured by the network. During a half-frame, different SSBs may be transmitted in different spatial directions, i.e. using different spatial beams, spanning the coverage area of a cell. Within the frequency span of a carrier, multiple SSBs can be transmitted. The Physical Cell Identities (PCIs) of SSBs transmitted in different frequency locations do not have to be unique, i.e. different SSBs in the frequency domain can have different PCIs. However, when an SSB is associated with an RMSI (which may be a Remaining Minimum System Information Block), the SSB corresponds to an individual cell, which has a unique NCGI (which may be a NR Cell Global Identifier). Such an SSB is referred to as a Cell-Defining SSB (CD-SSB). A PCell is always associated to one and only one CD-SSB located on the synchronization raster.

Since SSB beams can be transmitted to cover different parts of the cell's coverage area, and given that, from a User Equipment (UE) point of view, measurement reports are based on detection of such SSBs, it is possible to divide the cell in SSB coverage areas and to determine parameters such as load, composite capacity, resource status information to such partition of the cell. With this approach, SSB measurement reports from a UE allow the network to assess which portion of the cell the UE is in proximity of and the resource status information for that partition of the NR cell. This provides a much finer granularity than in Long Term Evolution (LTE) where resource status information is available at a per cell level.

SUMMARY

FIG. 1 shows an example of unbalanced load distribution between SSB within an NR cell that could allow MLB (Mobility Load Balancing) to the coverage area of SSB with low load. The example in FIG. 1 shows that introducing resource status information per SSB beam can be beneficial for enhancing MLB in NR. In this example, an NR serving cell is considered, where the cell is highly loaded at least in some local area defined, for instance, by the coverage area of different SSB beams. A target UE in the loaded area may report measurements that a neighbor cell-A is detected with good radio conditions, possibly including beam measurements, and also reports another cell that is farther away e.g. cell-B.

Assuming to use the LTE MLB solution as baseline for NR, the serving node can request resource status information to the target node which would indicate a high load in Cell-A, as at least the same number of UEs and same traffic as in the serving cell might be experienced.

If only cell-specific resource status information is available, the loaded serving node may be led to believe that the target node is also overloaded. However, with SSB-beam specific resource status information available, the serving cell can determine that, in the beam coverage area where the UE is moving, Cell-A has enough available capacity to accept the UE.

Cell Composite Available Capacity

The LTE system defines the cell Composite Available Capacity (CAC) to indicate the overall available resource level in a cell in either Downlink or Uplink. The CAC is defined as (cf. TS 32.522)

Composite Available Capacity=Cell Capacity Class Value*Capacity Value, where:

The Cell Capacity Class Value (CCCV) indicates the value that classifies cell capacity with regards to the other cells. The Cell Capacity Class Value Information Element (IE) only indicates resources that are configured for traffic purposes and it is expressed with an integer ranging from 1, indicating the minimum cell capacity, to 100, indicating the maximum cell capacity, following a linear relation between cell capacity and the Cell Capacity Class Value (TS 36.331). In TS 36.423, the cell capacity class value is an optional parameter in case of intra-LTE load balancing. If cell capacity class value is not present, then TS 36.423 assumes that bandwidth should be used instead to assess the capacity.

The Capacity Value (CV) indicates the amount of resources that are available relative to the total E-UTRAN resources. The capacity value should be measured and reported so that the minimum E-UTRAN resource usage of existing services is reserved according to implementation. The Capacity Value IE ranges between 0, indicating no available capacity, and 100, which indicates maximum available capacity. Capacity Value should be measured on a linear scale.

However, there currently exist certain challenges. A cell-specific CAC, as the value defined in LTE system, has two shortcomings. On one hand, a cell-specific CAC may incorrectly represent the cell available capacity in case of Multiple Input Multiple Output (MIMO) transmission capability. On the other hand, a cell specific CAC value does not provide any information about the distribution of the cell load/available capacity in spatial domain space. Knowledge of available capacity may be of extreme importance to optimize the network operation in case of advance antenna systems capable of MIMO transmission with narrow beams, like in the 3GPP NR system or LTE system with massive MIMO antenna array. FIGS. 2a and 2b illustrates an example of LTE cell-specific CAC used for characterizing the available capacity in a radio cell capable of spatial multiplexing users via MIMO transmission. In this example, a cell with CCCV=100 and 4 SSB beams is considered. FIG.

2a shows how resources are used to serve UEs under the coverage area of each of the SSB beams, while FIG. 2b shows how resources are utilized from the cell perspective. In FIGS. 2a and 2b, cell resources are shown on the X axis, while spatial layers are shown on the Y axis.

A close inspection of FIG. 2a reveals light traffic scheduled under the coverage area of all SSB beams. In particular, the cell schedules Users within the coverage area of SSB1 only in 40% of the cell resources Users within the coverage area of SSB2 only in 20% of the cell resources Users within the coverage area of SSB3 only in 20% of the cell resources Users within the coverage area of SSB4 only in 40% of the cell resources Given the MIMO transmission capabilities, it may be argued that the available capacity under the coverage area of each SSB beam ranges between 60% and 80%. Therefore, the cell overall appears lightly loaded and could accept more users/traffic under the coverage are of all 4 SSB beams.

However, if a cell-specific CAC as defined in the LTE system (see FIG. 2b) is used, only 30% of the capacity would appear available, i.e., CAC=3000 out of a CAC_max=10000. In other words, the cell would be considered highly loaded. A similar conclusion can be drawn if one would like to define the available capacity for a traffic slice.

It is in view of the above background and other considerations that the various embodiments of the present disclosure have been made.

It is proposed to provide a solution to address this problem, i.e. to enable determining of an estimate of the available capacity in different regions of the coverage area of a radio cell capable of MIMO transmission. Certain aspects of the present disclosure and their embodiments may provide solutions to these or other challenges.

This general object has been addressed by the appended independent claims. Advantageous embodiments are defined in the appended dependent claims.

According to a first aspect, there is provided a method, performed by a first network node, for providing resource status information to a second network node. The first network node controls a radio cell comprising a plurality of partition.

The method comprises determining a resource status information based on a ratio between a resource status associated to the radio cell and a resource status associated to at least one partition of the radio cell. The method further comprises transmitting, to the second network node, a resource status update message comprising at least one information element comprising the determined resource status information.

In some embodiments, the resources status information comprises at least one of: available capacity; radio resource utilization; traffic load; transport network load capacity; and hardware load.

In some embodiments provided herein, the overall resource status information associated to the radio cell is first determined and the resource status information associated to different partitions of the radio cell is thereafter determined as a function of the overall resource status information associated to the radio cell.

Thus, in some embodiments, the step of determining resource status information comprises determining resource status information associated to the radio cell controlled by the first network node and determining resource status information associated to at least one partition of the radio cell based on the determined resource status information associated to the radio cell.

In some embodiments, the method executed by the first network node comprises computing the resource status information of a radio cell controlled by the network node; computing the resource status information associated to one or more partition of the radio cell based on the resource status information of the radio cell; causing a resource status update message to be transmitted to a second network node, the resource status update message comprising: one or more information elements characterizing the resource status information of the radio cell (i.e., cell specific information elements); and one or more corresponding information elements characterizing the resource status information associated to one or more partitions of the radio cell (i.e., partition specific information elements).

In some embodiments, the at least one cell partition comprises at least one of: a coverage area of reference signal beams; a network slice; and a bandwidth part of an uplink or downlink band.

In some embodiments, a partition of a radio cell may be represented by the coverage area of reference signal beams, e.g. SSB beams, CSI-RS beams (i.e. Channel State Information Reference Signal); a network slice; a bandwidth part of an uplink or downlink band; or any combination of two or more of the above, e.g. a combination of network slices, coverage areas of reference signal beams and bandwidth parts, or a combination of network slices and coverage area of reference signal beams.

In some embodiments, the method executed by the first network node comprises computing the resource status information of a radio cell controlled by the network node; computing the resource status information associated to the coverage area of one or more downlink reference signal beams based on the resource status information of the radio cell; and causing a resource status update message to be transmitted to a second network node (optionally by the first network node) comprising: one or more information elements characterizing the resource status information associated to the cell (i.e., cell specific information elements); and one or more corresponding information elements characterizing the resource status information associated to the coverage area of one or more downlink reference signal beams (i.e. beam specific information elements).

In some embodiments, the step of determining resource status information associated to at least one partition of the radio cell further comprises determining, for at least one cell partition b, a coefficient $K_b$ relating an information element of the resource status information associated to the cell partition b to a corresponding information element of the resource status information associated to the radio cell.

In some embodiments, the resources status information associated to the cell partition $C_b$ is determined according to one of: a sum of the resources status information associated to the radio cell $C_{cell}$ and the coefficient $K_b$ associated to the cell partition b according to the formula $C_b=C_{cell}+K_b$; a product of the resources status information associated to the radio cell $C_{cell}$ and the coefficient $K_b$ associated to the cell partition b according to the formula $C_b=C_{cell} \cdot K_b$; and using a Composite Available Capacity (CAC) according to a product of a Cell Capacity Class Value (CCCV) and a Capacity Value (CV) according to the formula $CAC=CCCV \cdot CV$, and wherein the resources status information associated to the cell partition $C_b$ is calculated according to one of the following formulae: $C_b=CAC+K_b$; $C_b=CCCV+K_b$; $C_b=CV+K_b$; $C_b=CAC \cdot K_b$; $C_b=CCCV \cdot K_b$; and $C_b=CV \cdot K_b$.

In some embodiments provided herein, the resource status information associated to different partitions of the radio cell is first determined, and the overall resource status information associated to the radio cell is determined as a function of the resource status information associated to the different partitions of the radio cell.

Thus, in some embodiments, the step of determining resource status information comprises determining resource status information associated to at least one partition of the radio cell controlled by the first network node; and determining resource status information associated to the radio cell based on a linear or non-linear combination of the determined resource status information associated to the at least one partition of the radio cell.

Embodiments provided herein disclose methods for determining the available capacity in different regions of the coverage area of a radio cell, as well as the overall cell capacity as a function of the capacity available in different regions of the cell's coverage area.

In some embodiments, the method executed by the first network node comprises computing the available capacity associated to one or more partitions of a radio cell; computing the available capacity associated to the radio cell based on a linear or non-linear combination of the available capacity associated to one or more partitions of the radio cell; and causing a resource status update message to be transmitted (optionally by the first network node) to a second network node comprising one or more information elements characterizing the available capacity associated to the radio cell.

In some embodiments, the method executed by the first network node comprises computing the available capacity associated to the coverage area of one or more reference signal spatial beams transmitted within a radio cell; computing the available capacity associate to the radio cell based on a linear or non-linear combination of the available capacity associated to the coverage area of reference signal spatial beams transmitted in the radio cell; and causing a resource status update message to be transmitted to a second network node (optionally by the first network node) comprising one or more information elements characterizing the available capacity associated to the radio cell.

In some embodiments, the step of determining resource status information associated the radio cell further comprising associating a weight $w_b$ to the resources status information $C_b$ or the $b^{th}$ cell partition.

In some embodiments, the resources status information associated to the radio cell comprising N cell partitions, wherein N≥2, is determined according to one of: a weighted average of the resource status information $C_b$ associated to the N cell partitions according to the formula $C_{cell} = \sum_{b=1}^{N} w_b C_b$; and a weighted average of a non-linear function $f_b(\cdot)$ of resource status information $C_b$ associated to the N cell partitions according to the formula $C_{cell} = \sum_{b=1}^{N} w_b f_b(C_b)$.

In some embodiments, the resources status information associated to the radio cell comprising N cell partitions, wherein N≥2, is determined according to one of: a measure of a variance and/or standard deviation associated to a set of capacities $\{C_b\}_{b=1}^{N_{beams}}$ corresponding to the coverage area of the $N_{beams}$ downlink reference signal beams; a minimum resources status information among the resources status information $C_b$ associated to the N cell partitions according to the formula $$C_{cell} = \min_{b=1,\ldots,N} C_b;$$

a maximum resources status information among the resources status information $C_b$ associated to the N cell partitions according to the formula $$C_{cell} = \max_{b=1,\ldots,N} C_b;$$

and a product of a Beam Capacity Class Value (BCCV) and a Beam Capacity Value (BCV) according to the formula $C_b=BCCV_b \cdot BCV_b$, b=1, ..., N.

In some embodiments, the at least one cell partition of the radio cell controlled by the first network node comprises the coverage area of downlink reference signal beams and the downlink reference signal beams are transmitted in a predefined spatial direction. The downlink reference signal beams may comprise at least one of SSB beams and CSI-RS beams. The downlink reference signal beams may be transmitted using MIMO spatial multiplexing techniques.

In some embodiments, the transmitted resource status update message comprises at least one information element characterizing the resource status information associated to the at least one partition of the radio cell and/or at least one information element characterizing the resource status information associated to the radio cell.

Aspects of embodiments provide methods to configure the block error rate (BLER) target for a communication session between a network node and a user device.

There are, proposed herein, various embodiments which address one or more of the issues disclosed herein.

The present disclosure further provides a method performed by a base station for providing capacity information, the method comprising: computing resource status information of a radio cell controlled by the base station; and causing a resource status update message to be transmitted.

The present disclosure further provides a method performed by a base station for providing capacity information, the method comprising: computing the available capacity associated to one or more partitions of a radio cell; and causing a resource status update message comprising one or more information elements characterizing the available capacity associated to the radio cell to be transmitted.

According to a second aspect, there is provided a method, performed by a User Equipment (UE) for receiving information indicating a radio cell to connect to.

The method comprises receiving information indicating available capacity associated to at least one partition of the radio cell.

In some embodiments, the method further comprises connecting to the radio cell.

In some embodiments, the present disclosure provides a method performed by a wireless device for receiving information indicating a radio cell to connect to, the method comprising: receiving information indicating the available capacity associated to one or more partitions of the radio cell.

Further aspects of embodiments provide base stations, network nodes and wireless devices configured to execute one or more of the methods disclosed herein.

According to one aspect of the present disclosure, there is provided a first network node for providing resource status information to a second network node. The first network node controls a radio cell comprising a plurality of partitions.

The first network node is configured to determine a resource status information based on a ratio between a resource status associated to the radio cell and a resource status associated to at least one partition of the radio cell and to transmit, to the second network node, a resource status update message comprising at least one information element comprising the determined resource status information.

In some embodiments, the resources status information comprises at least one of available capacity; radio resource utilization; transport network load capacity; and hardware load associated.

In some embodiments, the first network node is configured to determine resource status information by determine resource status information associated to the radio cell controlled by the first network node; and determine resource status information associated to at least one partition of the radio cell based on the determined resource status information associated to the radio cell.

In some embodiments, the first network node further is configured to determine, for at least one cell partition b, a coefficient $K_b$ relating an information element of the resource status information associated to the cell partition b to a corresponding information element of the resource status information associated to the radio cell.

In some embodiments, the resources status information associated to the cell partition $C_b$ is determined according to one of: a sum of the resources status information associated to the radio cell $C_{cell}$ and the coefficient $K_b$ associated to the cell partition b according to the formula $C_b=C_{cell}+K_b$; a product of the resources status information associated to the radio cell $C_{cell}$ and the coefficient $K_b$ associated to the cell partition b according to the formula $C_b=C_{cell} \cdot K_b$; and using a CAC according to a product of a CCCV, and a CV according to the formula CAC=CCCV·CV, and wherein the resources status information associated to the cell partition $C_b$ is calculated according to at least one of the following formulae: $C_b=CAC+K_b$; $C_b=CCCV+K_b$; $C_b=CV+K_b$; $C_b=CAC \cdot K_b$; $C_b=CCCV \cdot K_b$; and $C_b=CV \cdot K_b$.

In some embodiments, the first network node is configured to determine resource status information by: determine resource status information associated to at least one partition of the radio cell controlled by the first network node; and determine resource status information associated to the radio cell based on a linear or non-linear combination of the determined resource status information associated to the at least one partition of the radio cell. The first network node may be further configured to determine resource status information associated the radio cell by associating a weight $w_b$ to the resources status information $C_b$ or the $b^{th}$ cell partition.

In some embodiments, the first network node further is configured to determine the resources status information associated to the radio cell comprising N cell partitions, wherein N≥2, according to one of: a weighted average of the resource status information $C_b$ associated to the N cell partitions according to the formula $C_{cell}=\Sigma_{b=1}^{N} w_b C_b$, wherein $w_b$ is a weight the first network node associates to the resources status information $C_b$ or the $b^{th}$ cell partition; and a weighted average of a non-linear function $f_b(\cdot)$ of resource status information $C_b$ associated to the N cell partitions according to the formula $C_{cell}=\Sigma_{b=1}^{N} w_b f_b(C_b)$.

In some embodiments, the first network node is configured to determine the resources status information associated to the radio cell comprising N cell partitions, wherein N≥2, according to one of: a measure of a variance and/or standard deviation associated to a set of capacities $\{C_b\}_{b=1}^{N_{beams}}$ corresponding to the coverage area of the $N_{beams}$ downlink reference signal beams; a minimum resources status information among the resources status information $C_b$ associated to the N cell partitions according to the formula $$C_{cell} = \min_{b=1,\ldots,N} C_b;$$

a maximum resources status information among the resources status information $C_b$ associated to the N cell partitions according to the formula $$C_{cell} = \max_{b=1,\ldots,N} C_b;$$

and a product of a BCCV and a BCV according to the formula $C_b=BCCV_b \cdot BCV_b$, b=1, . . . , N.

In some embodiments, the at least one cell partition comprises at least one of: a coverage area of reference signal beams; a network slice; and a bandwidth part of an uplink or downlink band. The at least one cell partition of the radio cell may comprise the coverage area of downlink reference signal beams and the downlink reference signal beams are transmitted in a predefined spatial direction. The downlink reference signal beams may comprise at least one of SSB beams and CSI-RS beams.

In some embodiments, the downlink reference signal beams are transmitted using MIMO spatial multiplexing techniques.

In some embodiments, the transmitted resource status update message comprises at least one information element characterizing the resource status information associated to the at least one partition of the radio cell and/or at least one information element characterizing the resource status information associated to the radio cell.

According to another aspect, there is provided a UE for receiving information indicating a radio cell to connect to.

The UE is configured to receive information indicating available capacity associated to at least one partition of the radio cell.

In some embodiments, the UE is further configured to connect to the radio cell.

Certain embodiments may provide one or more of the following technical advantage(s). Shortcomings of prior art may be resolved by enabling a determination of an estimate of the available capacity in different regions of the coverage area of a radio cell capable of MIMO transmission. This can enable more efficient mobility related decisions in the system, more efficient load balancing and load sharing among radio cells, thus resulting in an overall better spectral efficiency and system performance.

BRIEF DESCRIPTION OF THE DRAWINGS

These and other aspects, features and advantages will be apparent and elucidated from the following description of various embodiments, reference being made to the accompanying drawings, wherein.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The present disclosure relates to methods and apparatuses to configure the block error rate (BLER) target for a communication session between a network node and a user device. The various embodiments described in this disclosure relate to a first network node and a method for providing resource status information, and they relate to a UE and a method for receiving information indicating a radio cell to connect to. The proposed solution resolves shortcomings of prior art by enabling to determine an estimate of the available capacity in different regions of the coverage area of a radio cell capable of Multiple Input Multiple Output (MIMO) transmission. This can enable more efficient mobility related decisions in the system, more efficient load balancing and load sharing among radio cells, thus resulting in an overall better spectral efficiency and system performance.

In one of its aspects, the disclosure presented herein concerns a method, performed by a first network node, for providing resource status information to a second network node. The resources status information may comprise at least one of available capacity, radio resource utilization, traffic load, transport network load capacity, and hardware load. The first network node controls a radio cell comprising a plurality of partitions.

Figure 1:
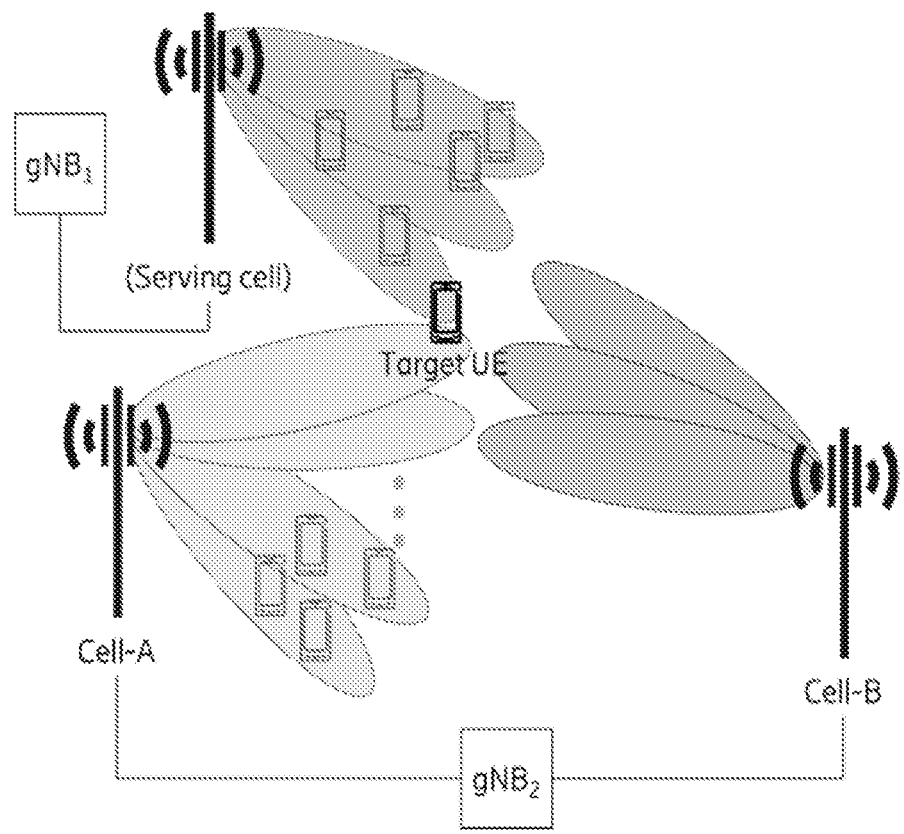
FIG. 1 shows an example of unbalanced load distribution between SSB within an NR cell that could allow MLB to the coverage area of SSB with low load.
Figure 2A:
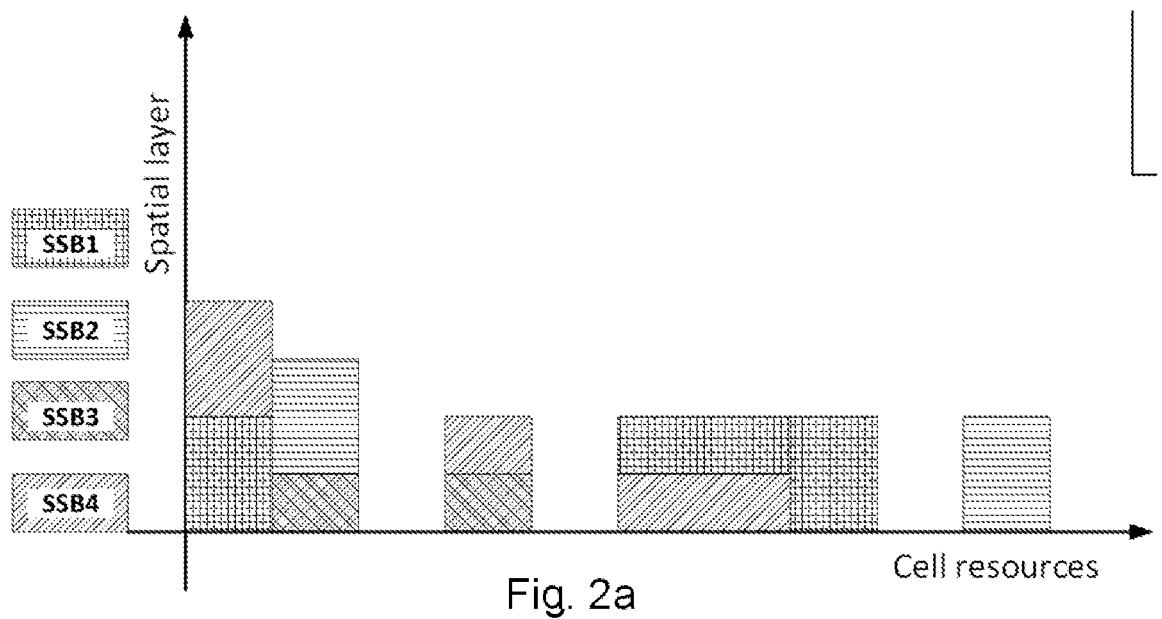
FIG. 2a shows resource utilization per SSB coverage area.
Figure 2B:
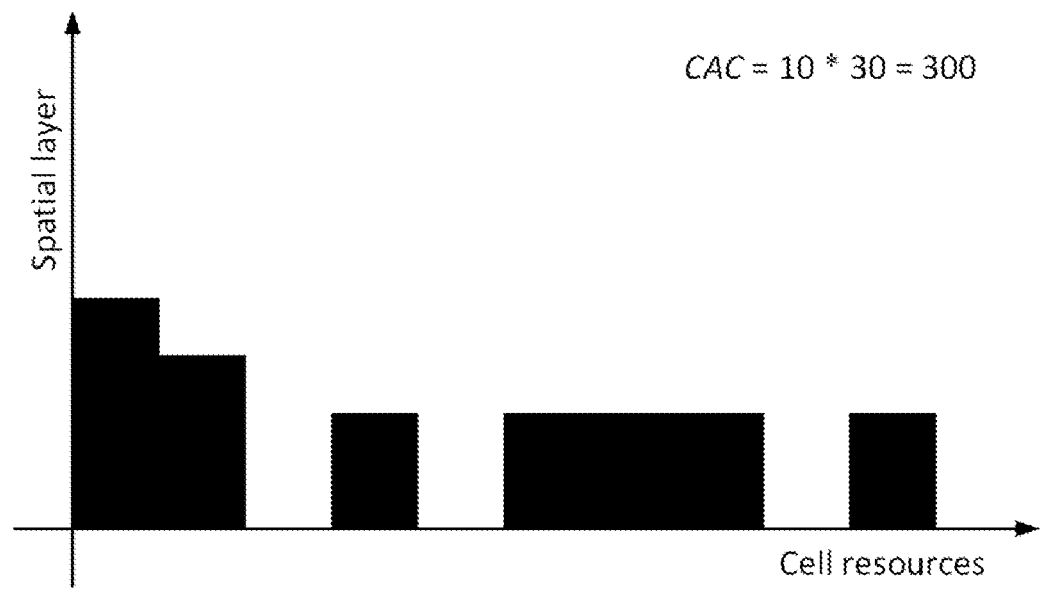
FIG. 2b shows resource utilization per cell.
Figure 3:
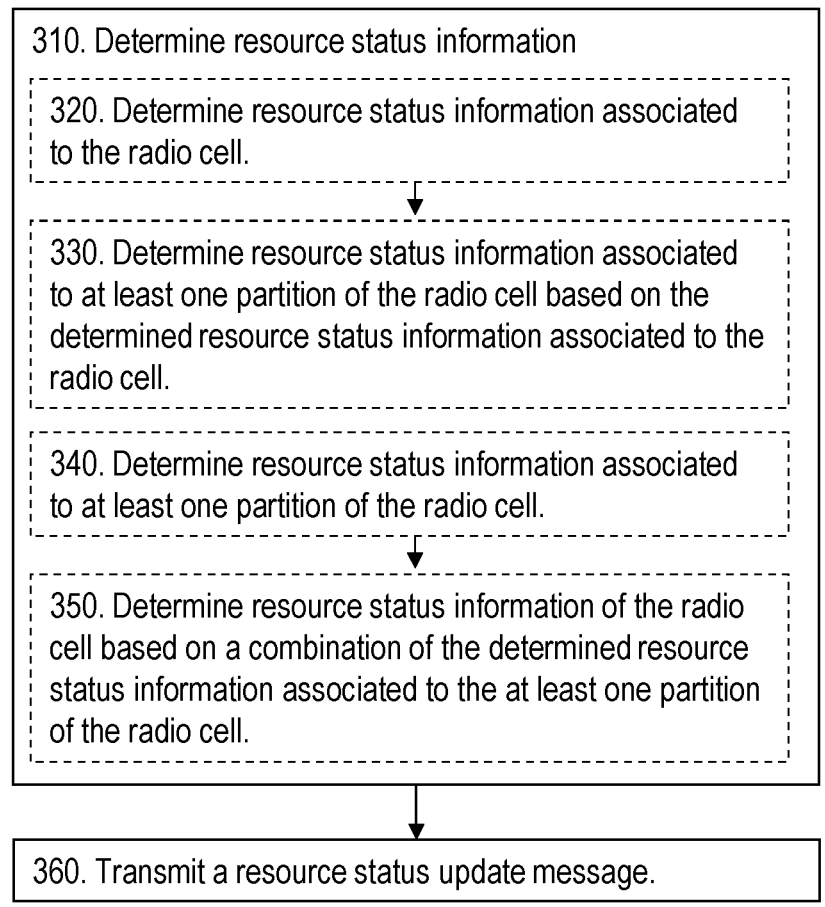
FIG. 3 is a flowchart of an example method performed by a first network node.

The method is now going to be described with reference to FIGS. 3 and 5. FIG. 3 is a flowchart of an example method 300 performed by a first network node 600 and FIG. 5 illustrates a flowchart according to the present disclosure.

Figure 5:
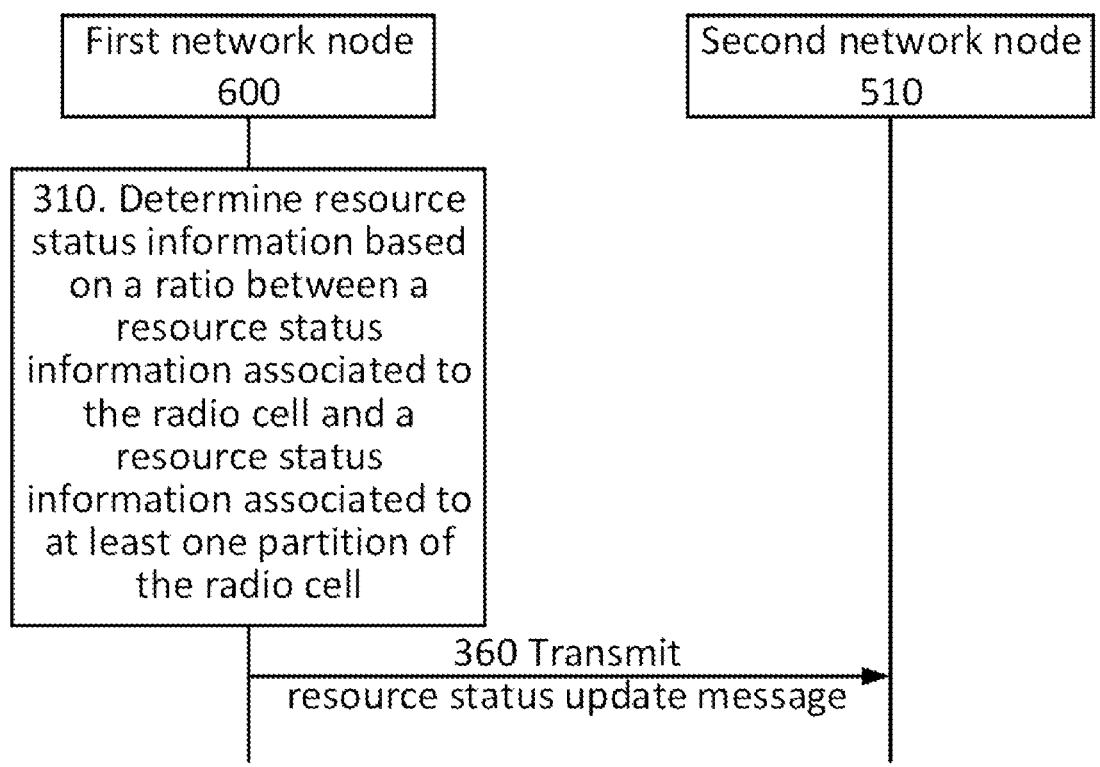
FIG. 5 illustrates a flowchart according to one embodiment.

As seen in FIGS. 3 and 5, the method 300 begins with step 310 of determining a resource status information based on a ratio between a resource status associated to the radio cell and a resource status associated to at least one partition of the radio cell. Thus, the resource status information is determined based on a relationship between resource status information associated to the overall radio cell and the resource status information associated to at least one partition of the overall radio cell. The at least one cell partition may comprise at least one of a coverage area of reference signal beams, a network slice, and a bandwidth part of an uplink or downlink band. In case the at least one partition of the radio cell controlled by the first network node 600 comprises the coverage area of downlink reference signal beams, the downlink reference signal beams may be transmitted in a predefined spatial direction. The downlink reference signal beams may comprise, for example, at least one of Synchronization Signals and PBCH Blocks (SSB) beams and Channel State Information Reference Signal (CSI-RS) beams. The downlink reference signal beams may be transmitted using MIMO spatial multiplexing techniques.

As further illustrated in FIGS. 3 and 5, the method 300 further comprises step 360 of transmitting, to the second network node 510, a resource status update message comprising at least one information element comprising the determined resource status information.

Due to the present disclosure, resource status information associated with a radio cell may be related to the resource status information associated with at least one partition of the radio cell and a resource status information may be determined and transmitted to a second network node 510. This enables more efficient mobility related decisions, more efficient load balancing and load sharing among radio cells, which results in an overall better spectral efficiency and system performance.

In some embodiments, the step 310 of determining resource status information may comprise step 320 of determining resource status information associated to the radio cell controlled by the first network node 600. Thereafter, the method 300 may continue with step 330 of determining resource status information associated to at least one partition of the radio cell based on the determined resource status information associated to the radio cell. Thus, resource status information associated to at least one partition of the radio cell may be determined based on the resource status information associated to the radio cell.

In other embodiments, the step 310 of determining resource status information may comprise step 340 of determining resource status information associated to at least one partition of the radio cell controlled by the first network node 600. Thereafter, the method 300 may continue with step 350 of determining resource status information associated to the radio cell based on a linear or non-linear combination of the determined resource status information associated to the at least one partition of the radio cell. Thus, resource status information associated to the radio cell may be determined based on the resource status information associated to at least one partition of the radio cell.

In the embodiments where resource status information associated to at least one partition of the radio cell is determined based on the resource status information associated to the radio cell, the step 330 of determining resource status information associated to at least one partition of the radio cell may, according to some embodiments, further comprise determining, for at least one cell partition b, a coefficient $K_b$. The coefficient $K_b$ relating an information element of the resource status information associated to the cell partition b to a corresponding information element of the resource status information associated to the radio cell.

In some embodiments, the resources status information associated to the cell partition $C_b$ may be determined according to a sum of the resources status information associated to the radio cell $C_{cell}$ and the coefficient $K_b$ associated to the cell partition b. Thus, the resources status information associated to the cell partition $C_b$ may be determined according to the formula $C_b=C_{cell}+K_b$. Alternatively, the resources status information associated to the cell partition $C_b$ may be determined according to a product of the resources status information associated to the radio cell $C_{cell}$ and the coefficient $K_b$ associated to the cell partition b. Thus, the resources status information associated to the cell partition $C_b$ may be determined according to the formula $C_b=C_{cell}\cdot K_b$. Alternatively, the resources status information associated to the cell partition $C_b$ may be determined by using a Composite Available Capacity (CAC) according to a product of a Cell Capacity Class Value (CCCV) and a Capacity Value (CV) according to the formula CAC=CCCV·CV. The resources status information associated to the cell partition $C_b$ may then be calculated according to one of the following formulae: $C_b$=CAC+$K_b$; $C_b$=CCCV+$K_b$; $C_b$=CV+$K_b$; $C_b$=CAC·$K_b$; $C_b$=CCCV·$K_b$; and $C_b$=CV·$K_b$.

In the embodiments where resource status information associated to the radio cell may be determined based on the resource status information associated to at least one partition of the radio cell, the step 350 of determining resource status information associated the radio cell may further comprise associating a weight $w_b$ to the resources status information $C_b$ or the $b^{th}$ cell partition. The resources status information associated to the radio cell comprising N cell partitions, wherein N≥2, may then be determined according to a weighted average of the resource status information $C_b$ associated to the N cell partitions. Thus, the resources status information associated to the radio cell may be determined according to the formula $C_{cell}=\Sigma_{b=1}^{N}w_bC_b$. Alternatively, resources status information associated to the radio cell may be determined according to a weighted average of a non-linear function $f_b(\cdot)$ of resource status information $C_b$ associated to the N cell partitions. Thus, resources status information associated to the radio cell may be determined according to the formula $C_{cell}=\Sigma_{b=1}^{N}w_bf_b(C_b)$.

In some embodiments, the resources status information associated to the radio cell comprising N cell partitions, wherein N≥2, may be determined according to a measure of a variance and/or standard deviation associated to a set of capacities $\{C_b\}_{b=1}^{N_{beams}}$ corresponding to the coverage area of the $N_{beams}$ downlink reference signal beams. Alternatively, the resources status information associated to the radio cell may be determined according to a minimum resources status information among the resources status information $C_b$ associated to the N cell partitions according to the formula $$C_{cell} = \min_{b=1,\ldots,N} C_b.$$

Alternatively, the resources status information associated to the radio cell may be determined according to a maximum resources status information among the resources status information $C_b$ associated to the N cell partitions according to the formula $$C_{cell} = \max_{b=1,\ldots,N} C_b.$$

Alternatively, the resources status information associated to the radio cell may be determined according to a product of a Beam Capacity Class Value (BCCV) and a Beam Capacity Value (BCV) according to the formula $C_b$=BCCV$_b$·BCV$_b$, b=1, ..., N.

The transmitted resource status update message may comprise at least one information element characterizing the resource status information associated to the at least one partition of the radio cell and/or at least one information element characterizing the resource status information associated to the radio cell.

According to another aspect of the present disclosure, there is provided a first network node 600 for providing resource status information to a second network node 510. The first network node 600 controls a radio cell comprising a plurality of partitions.

Figure 6A:
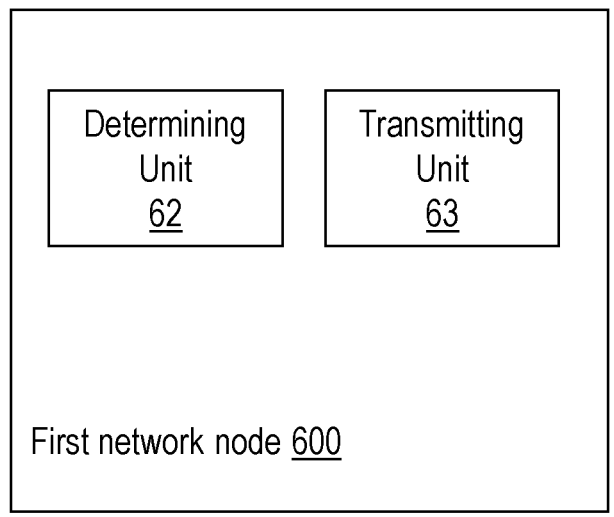
FIGS. 6a and 6b are schematic drawings illustrating an example of a first network node.
Figure 6B:
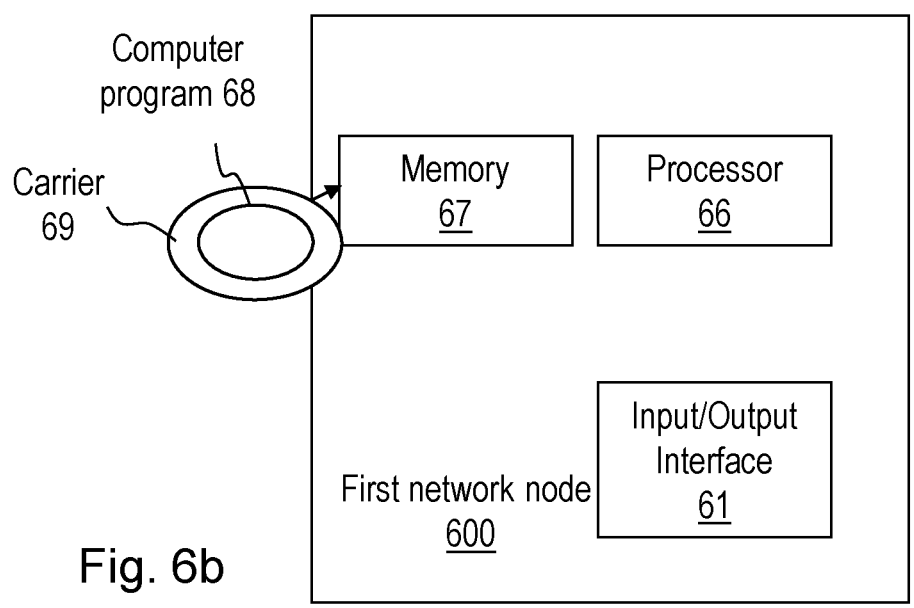

FIGS. 6a and 6b illustrates examples of the first network node 600. The first network node 600 is configured to perform the method 300 according to the first aspect. As illustrated in FIG. 6a, the first network node 600 may comprise a determining unit 62 and a transmitting unit 63 to perform the method 300. Alternatively, as illustrated in FIG. 6b, the first network node 600 may comprise a processor 66 and a memory 67. The memory 67 may store computer program code which, when run in the processor 66 may cause the first network node 600 to perform the method 300 according to the previously presented aspect.

The first network node 600 is configured to determine a resource status information based on a ratio between a resource status information associated to the radio cell and a resource status associated to at least one partition of the radio cell. The first network node 600 is further configured to transmit, to the second network node 510, a resource status update message comprising at least one information element comprising the determined resource status information.

In some embodiments, the first network node 600 may be configured to determine resource status information by determine resource status information associated to the radio cell controlled by the first network node 600. The first network node 600 may further be configured to determine resource status information associated to at least one partition of the radio cell based on the determined resource status information associated to the radio cell. Thus, resource status information associated to at least one partition of the radio cell may be determined as a function of the resource status information associated to the radio cell.

In other embodiments, the first network node 600 may be configured to determine resource status information by determine resource status information associated to at least one partition of the radio cell controlled by the first network node 600. The first network node 600 may further be configured to determine resource status information associated to the radio cell based on a linear or non-linear combination of the determined resource status information associated to the at least one partition of the radio cell. Thus, resource status information associated to the radio cell may be determined as a function of the resource status information associated to at least one partition of the radio cell.

In the embodiments where resource status information associated to at least one partition of the radio cell is determined as a function of the resource status information associated to the radio cell, the first network node 600 may be configured to determine, for at least one cell partition b, a coefficient $K_b$ relating an information element of the resource status information associated to the cell partition b to a corresponding information element of the resource status information associated to the radio cell. The first network node 600 may be configured to determine the resources status information associated to the cell partition $C_b$ according to a sum of the resources status information associated to the radio cell $C_{cell}$ and the coefficient $K_b$ associated to the cell partition b according to the formula $C_b=C_{cell}+K_b$. Alternatively, the first network node 600 may be configured to determine the resources status information associated to the cell partition $C_b$ according to a product of the resources status information associated to the radio cell $C_{cell}$ and the coefficient $K_b$ associated to the cell partition b according to the formula $C_b=C_{cell}\cdot K_b$. Alternatively, the first network node 600 may be configured to determine the resources status information associated to the cell partition $C_b$ by using a CAC according to a product of a CCCV and a CV according to the formula CAC=CCCV·CV. The resources status information associated to the cell partition $C_b$ may then be calculated according to at least one of the following formulae: $C_b$=CAC+$K_b$; $C_b$=CCCV+$K_b$; $C_b$=CV+$K_b$; $C_b$=CAC·$K_b$; $C_b$=CCCV·$K_b$; and $C_b$=CV·$K_b$.

In the embodiments where the first network node 600 is configured to determine status information associated to the radio cell based on a linear or non-linear combination of the determined resource status information associated to the at least one partition of the radio cell, the first network node 600 may be configured to determine resource status information associated the radio cell by associating a weight $w_b$ to the resources status information $C_b$ or the $b^{th}$ cell partition. The first network node 600 may be configured to, for example, determine the resources status information associated to the radio cell comprising N cell partitions, wherein N≥2, according to one of: a weighted average of the resource status information $C_b$ associated to the N cell partitions according to the formula $C_{cell}=\Sigma_{b=1}^{N}w_b C_b$. $w_b$ is a weight the first network node 600 may associate to the resources status information $C_b$ or the $b^{th}$ cell partition. Alternatively, the first network node 600 may be configured to determine the resources status information associated to the radio cell according to a weighted average of a non-linear function $f_b(\cdot)$ of resource status information $C_b$ associated to the N cell partitions according to the formula $C_{cell}=\Sigma_{b=1}^{N}w_b f_b(C_b)$.

In some embodiments, the first network node 600 may be configured to determine the resources status information associated to the radio cell comprising N cell partitions, wherein N≥2, according to a measure of a variance and/or standard deviation associated to a set of capacities $\{C_b\}_{b=1}^{N_{beams}}$ corresponding to the coverage area of the $N_{beams}$ downlink reference signal beams. Alternatively, the first network node 600 may be configured to determine the resources status information associated to the radio cell according to a minimum resources status information among the resources status information $C_b$ associated to the N cell partitions according to the formula $$C_{cell} = \min_{b=1,\ldots,N} C_b.$$

Alternatively, the first network node 600 may be configured to determine the resources status information associated to the radio cell according to a maximum resources status information among the resources status information $C_b$ associated to the N cell partitions according to the formula $$C_{cell} = \max_{b=1,\ldots,N} C_b.$$

Alternatively, the first network node 600 may be configured to determine the resources status information associated to the radio cell according to a product of a BCCV and a BCV according to the formula $C_b$=BCCV$_b$·BCV$_b$, b=1, ..., N.

Different embodiments of the present disclosure are now going to be described more in detail.

Embodiments for Resource Status Information Associated to Coverage Area of Reference Signals Beams As previously described, in some aspects of embodiments, a partition of the radio cell may be represented by the coverage area associated to a downlink reference signal transmitted in a region of the cell's coverage area. In one example, the downlink reference signal may be SSBs transmitted in a predefined spatial direction using, for instance, MIMO beamforming techniques. Alternatively, the downlink reference signals may be CSI-RS beams. For ease of reference, in the following this is referred to as the coverage area of an SSB beam, or more generally the coverage area of a downlink reference signal beam.

The method 300 executed by the first network node 600 may comprise:
  computing the resource status information of a radio cell controlled by the network node 600;
  computing the resource status information associated to the coverage area of one or more downlink reference signal beams based on the resource status information of the radio cell;
  transmitting a resource status update message to a second network node 510 comprising
    one or more information elements characterizing the resource status information associated to the cell (i.e., cell specific information elements); and
    one or more corresponding information elements characterizing the resource status information associated to the coverage area of one or more downlink reference signal beams (i.e. beam specific information elements).

In some embodiments a radio cell may comprise $N_{beams}$≥1 downlink reference signal beams, indexed by integers b=0, ..., $N_{beams}$−1, each being spatially transmitted to cover different parts of the cell coverage area. Furthermore, the radio cell as a whole and each individual downlink reference signal beam (or the corresponding coverage area) may have associated a resource status information, which may comprise one or more information elements in the group of: available capacity; radio resource utilization; traffic load; transport network load capacity and hardware load.

In some embodiments, the network node 600 may compute, for at least one downlink reference signal beam b, a coefficient $K_b$ relating an information element of the resource status information associated to the coverage area of the beam b to a corresponding information element of the resource status information of the cell.

transmit a resource status update message to a second network node 510 comprising the resource status information element associated to the cell; and one or more coefficients $K_b$ relating resource status information elements associated to the coverage area of one or more downlink reference signal beams b to the corresponding resource status information element associated to the cell.

Hereafter are described aspects of embodiments using, as exemplifying case, a resource status information element representing the available capacity for the cell (i.e., cell specific available capacity) and for the coverage area of individual downlink reference signal beams (i.e., beam specific available capacity). The description of the aspects of embodiments extends mutatis mutandis to other type of resource status information elements, such as: radio resource utilization, traffic load, transport network load capacity, hardware load, etc.

In some embodiments, the network node may compute the available capacity associated to the coverage area of a downlink reference signal beam $C_b$ as the sum of the available capacity of the radio cell $C_{cell}$ and the coefficient $K_b$ associated to the downlink reference signal beam b $$C_b = C_{cell} + K_b \quad (1)$$

Depending on the value and the sign of the coefficient $K_b$, three cases can occur:

If $K_b=0$, the available capacity associated to the coverage area of the beam b is the same as the available capacity of the radio cell.

If $K_b>0$ (i.e. if $K_b$ is strictly positive), the available capacity associated to the coverage area of the beam b is higher than the available capacity of the radio cell.

If $K_b<0$ (i.e. if $K_b$ is strictly negative), the available capacity associated to the coverage area of the beam b is lower than the available capacity of the radio cell.

It is clear to the skilled reader that the relation (1) can equivalently be written with a subtraction operation, in which case the meaning of positive or negative value of the coefficient $K_b$ are inverted.

As earlier stated, these embodiments (hence the expression (1)) extend mutatis mutandis to other types of resource status information elements, such as radio resource utilization, traffic load, transport network load capacity, hardware load, etc.

In some embodiments, the network node may compute the available capacity associated to the coverage area of a downlink reference signal beam $C_b$ as the product of the available capacity of the radio cell $C_{cell}$ and the coefficient $K_b$ associated to the downlink reference signal beam b $$C_b = C_{cell} \cdot K_b \quad (2)$$

Depending on the value of the coefficient $K_b$, three cases can occur:

If $K_b=1$, the available capacity associated to the coverage area of the beam b is the same as the available capacity of the radio cell.

If $K_b>1$ (i.e. if $K_b$ is strictly larger than 1), the available capacity associated to the coverage area of the beam b is higher than the available capacity of the radio cell.

If $K_b<1$ (i.e. if $K_b$ is strictly smaller than 1), the available capacity associated to the coverage area of the beam b is lower than the available capacity of the radio cell.

It is clear to the skilled reader that the relation (2) can equivalently be written with a division operation, in which case the meaning of the coefficient $K_b$ being strictly larger or strictly smaller than 1 are inverted.

As earlier stated, these embodiments (hence the expression (2)) extend mutatis mutandis to other types of resource status information elements, such as radio resource utilization, traffic load, transport network load capacity, hardware load, etc.

The available capacity of the cell may be characterized by the composite available capacity defined for a 3GPP LTE systems, Composite Available Capacity=Cell Capacity Class Value*Capacity Value where the Cell Capacity Class Value (CCCV) indicates the total resources configured within the cell for traffic purposes in the coverage area of a reference signal beam, whereas the Cell Capacity Value (CV) indicates the amount of resources that are available for the network slice relative to the total resources CCCV. In what follows the following short hand notation is used:

CAC=CCCV·CV

Therefore, according to previous aspects of embodiments, the available capacity associated to the coverage area of a downlink reference signal beam $C_b$ can expressed as one of the following expressions:

$$C_b = CAC + K_b \quad (3)$$

$$C_b = CCCV + K_b \quad (4)$$

$$C_b = CV + K_b \quad (5)$$

In other words, the available cell capacity $C_{cell}$ in expression (1) can be represented by one of:

The cell Composite Available Capacity (CAC), i.e. $C_{cell}$=CAC

The Cell Capacity Class Value (CCCV), i.e. $C_{cell}$=CCCV

The cell Capacity Value (CV), i.e., $C_{cell}$=CV

Thus, these embodiments relate the available capacity associated to the coverage area of a downlink reference signal beam (such as an SSB beam or a CSI-RS beam) to the Composite Available Capacity of the cell, or to the Cell Capacity Class Value or to the cell Capacity Value.

In some embodiments, the available capacity associated to the coverage area of a downlink reference signal beam $C_b$ is expressed as one of the following expressions:

$$C_b = CAC \cdot K_b \quad (6)$$

$$C_b = CCCV \cdot K_b \quad (7)$$

$$C_b = CV \cdot K_b \quad (8)$$

In other words, the available cell capacity $C_{cell}$ in expression (2) can be represented by one of:

The cell Composite Available Capacity (CAC), i.e. $C_{cekk}$=CAC

The Cell Capacity Class Value (CCCV), i.e. $C_{cell}$=CCCV

The cell Capacity Value (CV), i.e., $C_{cell}$=CV

Thus, these embodiments provide a further way to relate the available capacity associated to the coverage area of a downlink reference signal beam (such as an SSB beam or a CSI-RS beam) to the Composite Available Capacity of the cell, or to the Cell Capacity Class Value or to the cell Capacity Value.

According to other embodiments, where resource status information comprise available capacity associated to coverage area of reference signals beams, the method 300 executed by the first network node 600 may comprise:

computing the available capacity $C_b$ associated to the coverage area of $N_{beams} \geq 2$ downlink reference signal beams, indexed by b=1, ..., $N_{beams}$ the step of computing the available capacity associate to the radio cell may be based on a linear or non-linear combination of the available capacity associated coverage area of $N_{beams} \geq 2$ downlink reference signal beams;

causing a resource status update message to be transmitted to a second network node 510 comprising one or more information elements characterizing the available capacity associated to the radio cell, wherein the resource status update message may be transmitted by the first network node 600.

In some aspects of embodiments, the network node 600 may determine the available capacity $C_b$ associated to the coverage area of $N_{beams} \geq 2$ downlink reference signal beams, indexed by b=1, ..., $N_{beams}$ and compute the available capacity associated to the radio cell covered by the $N_{beams}$ downlink reference signals as a weighted average of the capacity $C_b$ associated to the coverage area of the downlink reference signal beams, i.e., $$C_{cell} = \sum_{b=1}^{N_{beams}} w_b C_b$$

wherein $w_b$ is the weight the network node associates to the capacity $C_b$ or the b-th downlink reference signal beam.

The network node 600 may associate equal weight to the capacity of each downlink reference signal beam, i.e. $w_b$=1/$N_{beams}$ for all downlink reference signal beams b=1, ..., $N_{beams}$. Alternatively, the network node 600 may associate different weights to the capacity of each downlink reference signal beam so as to represent different relevance to the determination of the available cell capacity. The weight associated to the capacity of the coverage area of a downlink reference signal may, for instance, be determined based on one or more information elements in the group of: the type and or the amount of traffic served in said area; the interference created by the network node 600 to neighboring cells to serve users in the coverage area of the downlink reference signal beam; the interference received from users in the coverage area of the downlink reference signal beam from neighboring cells; and statistics associated to the number and/or type of active users served by the network node under the coverage area of the downlink reference signal beam.

In some aspects of embodiments, the network node 600 may:

determine the available capacity $C_b$ associated to the coverage area of $N_{beams}$>2 downlink reference signal beams, indexed by b=1, ..., $N_{beams}$ and compute the available capacity associated to the radio cell covered by the $N_{beams}$ downlink reference signals as a weighted average of a non-linear function $f_b(\cdot)$ of the capacity $C_b$ associated to the coverage area of the downlink reference signal beams, i.e., $$C_{cell} = \sum_{b=1}^{N_{beams}} w_b f_b(C_b)$$

Examples of non-linear functions $f_b(\cdot)$ may include a logarithmic function, an exponential function, a sigmoid function, and other suitable functions.

In some aspects of embodiments, the network node 600 may determine the available capacity $C_b$ associated to the coverage area of $N_{beams} \geq 2$ downlink reference signal beams, indexed by b=1, ..., $N_{beams}$ and compute the available capacity associated to the radio cell covered by the $N_{beams}$ downlink reference signals as either the minimum or the maximum available capacity among the available capacity $C_b$ associated to the coverage area the $N_{beams}$ beams, i.e.

$$C_{cell} = \min_{b=1,...,N_{beams}} C_b$$

$$C_{cell} = \max_{b=1,...,N_{beams}} C_b$$

In some aspects of embodiments, the network node 600 may further determine a measure of the variance and/or standard deviation associated to the set of capacities $\{C_b\}_{b=1}^{N_{beams}}$ corresponding to the coverage area of the $N_{beams}$ downlink reference signal beams.

The network node 600 may therefore compute the standard deviation associated to the set of capacities $\{C_b\}_{b=1}^{N_{beams}}$ corresponding to the coverage area of the $N_{beams}$ beams downlink reference signal beams as $\sigma_C = \sqrt{(C_b - \mu_C)^2}$, where $$\mu_C = \frac{1}{N_{beams}} \sum_{b=1}^{N_{beams}} C_b$$

represents the average capacity corresponding to the coverage area of the $N_{beams}$ beams downlink reference signal beams.

In some aspects of embodiments, the network node 600 may transmit a resource status update message to a second network node 510 comprising one or more information elements characterizing the available capacity associated to the radio cell chosen in the group of:

minimum available capacity among the capacities $\{C_b\}_{b=1}^{N_{beams}}$ corresponding to the coverage area of the $N_{beams}$ (as defined by a previous embodiment)

maximum available capacity among the capacities $\{C_b\}_{b=1}^{N_{beams}}$ corresponding to the coverage area of the $N_{beams}$ (as defined by a previous embodiment)

average available capacity $\mu_C$ among the capacities $\{C_b\}_{b=1}^{N_{beams}}$ corresponding to the coverage area of the $N_{beams}$ (as defined by a previous embodiment)

standard deviation $\sigma_C$ of the available capacity among the capacities $\{C_b\}_{b=1}^{N_{beams}}$ corresponding to the coverage area of the $N_{beams}$ (as defined by a previous embodiment)

variance $\sigma_C^2$ of the available capacity among the capacities $\{C_b\}_{b=1}^{N_{beams}}$ corresponding to the coverage area of the $N_{beams}$ (as defined by a previous embodiment).

As an example of this, the network node may characterize the available capacity for the entire cell with the pair of information elements minimum available capacity among the capacities $\{C_b\}_{b=1}^{N_{beams}}$ corresponding to the coverage area of the $N_{beams}$ (as defined by a previous embodiment); and standard deviation $\sigma_C$ of the available capacity among the capacities $\{C_b\}_{b=1}^{N_{beams}}$ corresponding to the coverage area of the $N_{beams}$ (as defined by a previous embodiment)

and therefore, transmit two information elements to characterize the available capacity of the cell. As will be appreciated, more or fewer information elements may also be transmitted.

The network node 600 may determine the available capacity $C_b$ associated to the coverage area of a downlink reference signal beam as Beam Available Capacity=Beam Capacity Class Value*Beam Capacity Value where the Beam Capacity Class Value (BCCV) indicates the total resources configured within the cell for traffic purposes in the coverage area of a reference signal beam, whereas the Beam Capacity Value (BCV) indicates the amount of resources that are available within the coverage area of the downlink reference signal beam relative to the total resources BCCV. In what follows we shall use the short hand notation $C_b = BCCV_b \cdot BCV_b$ $b=1, \ldots, N_{beams}$ to denote the available capacity associated to the coverage area of $N_{beams}$ downlink reference signals beams indexed by $b=1, \ldots, N_{beams}$.

The value of $BCCV_b$ can be determined as a function of the cell capacity class value (CCCV) depending on how the cell resources are distributed among different downlink reference signal beams.

In some aspects of embodiments, $BCCV_b$=CCCV for all reference signal beams in case of full reuse of the cell's resources among the coverage are of each reference signal beam.

In further aspects of embodiments, $BCCV_b$ can be fraction of CCCV such that $\Sigma_{b=1}^{N_{beams}} BCCV_b$=CCCV in case the cell's resources are orthogonally divided among the coverage area of different reference signal beams.

In still further aspects of embodiments, when the cell's resources are partly reused among the coverage area of different SSB beams, $BCCV_b$ can be fraction of CCCV such that $\Sigma_{b=1}^{N_{beams}} BCCV_b \geq CCCV$. For instance, the cell may allow full reuse among the coverage areas of each SSB, but in practice at the border between the coverage area of two SSBs is possible that the scheduler will use different resources, thus $BCCV_b \leq CCCV$ but $\Sigma_{b=1}^{N_{beams}} BCCV_b \geq CCCV$.

Embodiments for Resource Status Associated to Network Slices

In some aspects of embodiments, a partition of the radio cell may be represented by a network slice as defined, for instance, by the partition of the cell time-frequency resources into groups with each group of resources being allocated to a network service.

Therefore, in some aspects of embodiments, the method 300 executed by the first network node 600 may comprise:
  computing the resource status information associated to a radio cell controlled by the first network node;
  computing the resource status information associated one or more network slices available in the cell based on the resource status information of the radio cell;
  transmitting a resource status update message to a second network node 510 comprising
    one or more information elements characterizing the resource status information associated to the cell (i.e., cell specific information elements); and
    one or more corresponding information elements characterizing the resource status information associated to one or more network slices available in the cell (i.e. network slices specific information elements).

A radio cell may serve $N_s \geq 1$ network slices indexed by integers $s=0, \ldots, N_s-1$. Furthermore, the radio cell as a whole and each individual network slice may have associated a resource status information In some embodiments, the network node 600 may
  compute, for at a network slice s served by the radio cell, a coefficient $K_s$ relating an information element of the resource status information associated to the network slice s to a corresponding information element of the resource status information of the cell.
  transmit a resource status update message to a second network node 510 comprising
    the resource status information element associated to the cell; and
    one or more coefficients $K_s$ relating resource status information elements associated to network slices s served by the cell to the corresponding resource status information element associated to the cell.

Hereafter are described aspects of embodiments using, as exemplifying case, a resource status information element representing the available capacity for the cell (i.e., cell specific available capacity) and for the coverage area of individual network slices (i.e., network slice specific available capacity). The description of the aspects of embodiments extends mutatis mutandis to other type of resource status information elements, such as: Radio resource utilization, traffic load, Transport network load capacity, Hardware load, etc.

In some embodiments, the network node 600 may compute the available capacity associated to the coverage area of a network slice $C_s$ as the sum of the available capacity of the radio cell $C_{cell}$ and the coefficient $K_s$ associated to the network slice s $$C_s = C_{cell} + K_s \qquad (9)$$

Depending on the value and the sign of the coefficient $K_s$, three cases can occur:
  If $K_s$=0, the available capacity associated to the network slice s the same as the available capacity of the radio cell.
  If $K_s$>0 (i.e. if $K_s$ is strictly positive), the available capacity associated to the network slice s is higher than the available capacity of the radio cell.

If $K_s<0$ (i.e. if $K_s$ is strictly negative), the available capacity associated to the coverage area of the network slice s is lower than the available capacity of the radio cell.

It is clear to the skilled reader that the relation (9) can equivalently be written with a subtraction operation, in which case the meaning of positive or negative value of the coefficient $K_s$ are inverted.

As earlier stated, these embodiments (hence the expression (9)) extend mutatis mutandis to other type of resource status information elements, such as Radio resource utilization, traffic load, Transport network load capacity, Hardware load, etc.

Similar to previous embodiments, the network node 600 can compute the available capacity $C_s$ associated to a network slice s as one of the following expressions:

$$C_s = CAC + K_s \quad (10)$$

$$C_s = CCCV + K_s \quad (11)$$

$$C_s = CV + K_s \quad (12)$$

In other words, the available cell capacity $C_{cell}$ in expression (9) may be represented by one of:
- The cell Composite Available Capacity (CAC), i.e. $C_{cell} = CAC$
- The Cell Capacity Class Value (CCCV), i.e. $C_{cell} = CCCV$
- The cell Capacity Value (CV), i.e., $C_{cell} = CV$ Thus, these embodiments relate the available capacity associated to the coverage area of a downlink reference signal beam (such as an SSB beam or a CSI-RS beam) to the Composite Available Capacity of the cell, or to the Cell Capacity Class Value or to the cell Capacity Value.

In some embodiments, the network node 600 may compute the available capacity associated to a network slice $C_s$ as the product of the available capacity of the radio cell $C_{cell}$ and the coefficient $K_s$ associated to the network slice s $$C_s = C_{cell} \cdot K_s \quad (13)$$

Depending on the value of the coefficient $K_s$, three cases can occur:
- If $K_s=1$, the available capacity associated to the network slice s the same as the available capacity of the radio cell.
- If $K_s>1$ (i.e. if $K_s$ is strictly larger than 1), the available capacity associated to the network slice s is higher than the available capacity of the radio cell.
- If $K_s<1$ (i.e. if $K_s$ is strictly less than 1), the available capacity associated to the coverage area of the network slice s is lower than the available capacity of the radio cell.

It is clear to the skilled reader that the relation (13) can equivalently be written with a division operation, in which case the meaning of the coefficient $K_s$ being strictly larger or strictly smaller than 1 are inverted.

As earlier stated, these embodiments (hence the expression (13)) extend mutatis mutandis to other type of resource status information elements, such as radio resource utilization, traffic load, transport network load capacity, hardware load, etc.

Similar to previous embodiments, the network node 600 may compute the available capacity $C_s$ associated to a network slice s as one of the following expressions:

$$C_s = CAC \cdot K_s \quad (14)$$

$$C_s = CCCV \cdot K_s \quad (15)$$

$$C_s = CV \cdot K_s \quad (16)$$

In other words, the available cell capacity $C_{cell}$ in expression (13) can be represented by one of:
- The cell Composite Available Capacity (CAC), i.e. $C_{cell} = CAC$
- The Cell Capacity Class Value (CCCV), i.e. $C_{cell} = CCCV$
- The cell Capacity Value (CV), i.e., $C_{cell} = CV$ Thus, these embodiments relate the available capacity associated to the coverage area of a downlink reference signal beam (such as an SSB beam or a CSI-RS beam) to the Composite Available Capacity of the cell, or to the Cell Capacity Class Value or to the cell Capacity Value.

According to other embodiments, where resource status information comprises available capacity, a partition of the radio cell may be represented by a network slice as defined, for instance, by the partition of the cell time-frequency resources into groups with each group of resources being allocated to a network service.

In these embodiments, the method 300 executed by the first network node 600 may comprise:
- determining the available capacity $C_s$ associated to $N_s \geq 2$ network slices, indexed by $s=1, \ldots, N_s$ which comprise the cell partitions and
- the available capacity associate to the radio cell may be computed based on a linear or non-linear combination of the available capacity of the $N_s$ network slices available in the cell; and
- transmitting a resource status update message to a second network node comprising one or more information elements characterizing the available capacity associated to the radio cell.

In some aspects of the embodiments, the network node 600 may
- determine the available capacity $C_s$ associated to $N_s \geq 2$ network slices, indexed by $s=1, \ldots, N_s$ which comprise the cell partitions and
- compute the available capacity associated to the radio cell portioned into $N_s$ network slices as a weighted average of the capacity $C_s$ associated to each network slice, i.e., $$C_{cell} = \sum_{s=1}^{N_s} w_s C_s$$

wherein $w_s$ is the weight the network node associates to the capacity $C_s$ or the s-th network slice. The network node 600 may associate equal weight to the capacity of each network slice, i.e. $w_s = 1/N_s$ for all network slices $s=1, \ldots, N_s$. Alternatively, the network node 600 may associate different weights to the capacity of each network slice so as to represent different relevance to the determination of the available cell capacity. The weight associated to the capacity of each network slice may, for instance, be determined based on one or more information elements in the group of the type and or the amount of traffic served by the network slice; the interference created by the network node 600 to neighboring cells to serve users belonging to the network slice; the interference received from users of belonging to the same network slice but served by a neighboring network node; and the interference received from users of belonging to other network slices and served by a neighboring network node.

In some aspects of embodiments, the network node 600 may:
- determine the available capacity $C_s$ associated to $N_s \geq 2$ network slices, indexed by b=1, ..., $N_s$ and
- compute the available capacity associated to the radio cell covered by the $N_{beams}$ downlink reference signals as a weighted average of a non-linear function $f_b(\cdot)$ of the capacity $C_b$ associated to the coverage area of the downlink reference signal beams, i.e., $$C_{cell} = \sum_{s=1}^{N_s} w_s f_s(C_s)$$

Examples of non-linear functions $f_s(\cdot)$ may include a logarithmic function, an exponential function, a sigmoid function and other suitable functions.

In some aspects of embodiments, the network node 600 may
- determine the available capacity $C_s$ associated to $N_s \geq 2$ network slices, indexed by b=1, ..., $N_s$ and
- compute the available capacity associated to the radio cell partitioned into $N_s$ network slices as either the minimum or the maximum available capacity among the available capacity $C_s$ associated to the $N_s$ network slices, i.e.

$$C_{cell} = \min_{s=1,\ldots,N_s} C_s$$

$$C_{cell} = \max_{s=1,\ldots,N_s} C_s$$

The network node 600 may further
- determine a measure of the variance and/or standard deviation associated to the set of capacities $\{C_s\}_{s=1}^{N_s}$ corresponding to the $N_{beams}$ network slices available in the cell.

The network node 600 may therefore compute the standard deviation associated to the set of capacities $\{C_s\}_{s=1}^{N_s}$ corresponding to the $N_s$ network slices available in the cell as $\sigma_C = \sqrt{(C_s - \mu_C)^2}$, wnere $$\mu_C = \frac{1}{N_s}\sum_{k=1}^{N_s} C_S$$

represents the average capacity corresponding to the $N_s$ network slices available in the cell.

In some aspects of embodiments, the network node 600 may transmit a resource status update message to a second network node 510 comprising one or more information elements characterizing the available capacity associated to the radio cell chosen in the group of:
- minimum available capacity among the capacities $\{C_s\}_{s=1}^{N_s}$ corresponding to the $N_s$ network slices available in the cell (as in previous embodiments)
- maximum available capacity among the capacities $\{C_s\}_{s=1}^{N_s}$ corresponding to the $N_s$ network slices available in the cell (as in previous embodiments)
- average available capacity $\mu_s$ among the capacities $\{C_s\}_{s=1}^{N_s}$ corresponding to the $N_s$ network slices available in the cell (as in previous embodiments)
- standard deviation $\sigma_C$ of the capacities $\{C_s\}_{s=1}^{N_s}$ corresponding to the $N_s$ network slices available in the cell (as in previous embodiments)
- variance $\sigma_C^2$ of the capacities $\{C_s\}_{s=1}^{N_s}$ corresponding to the $N_s$ network slices available in the cell (as in previous embodiments)

As an example of this, the network node 600 may characterize the available capacity for the entire cell with the pair of information elements
- minimum available capacity among the capacities $\{C_s\}_{s=1}^{N_s}$ corresponding to the $N_s$ network slices available in the cell (as in previous embodiments); and
- standard deviation $\sigma_C$ of the capacities $\{C_s\}_{s=1}^{N_s}$ corresponding to the $N_s$ network slices available in the cell (as in previous embodiments)

and therefore, transmit two information elements to characterize the available capacity of the cell. As will be appreciated, more or fewer information elements may also be transmitted.

In some aspects of embodiments, a partition of the radio cell is represented a network slice. The available capacity associated to a network slice can be determined as Slice Available Capacity=Slice Capacity Class Value*Slice Capacity Value where the Slice Capacity Class Value (SCCV) indicates the total resources configured within the cell for traffic purposes in the coverage area of a reference signal beam, whereas the Slice Capacity Value (SCV) indicates the amount of resources that are available for the network slice relative to the total resources SCCV. In what follows, the subsequent short hand notation may be used $CAC_s = SCCV_s \cdot SCV_s$ $s=1,\ldots,N_{slices}$ to denote the available capacity associated to $N_{slices}$ network slices indexed by s=1, ..., $N_{slices}$. The value of $SCCV_s$ can be determined as a function of the cell capacity class value (CCCV) depending on how the cell resources are distributed among different network slices:
- In some aspects of embodiments, $SCCV_s$=CCCV for all network slices if the cell resources can be fully reused by all network slices.
- In further aspects of embodiments, $SCCV_s$ can be fraction of CCCV such that $\Sigma_{s=1}^{N_{slices}} SCCV_s = CCCV$ in case the cell's resources are orthogonally divided among network slices.
- In still further aspects of embodiments, when the cell's resources are partly reused among different network slices, $SCCV_s$ can be fraction of CCCV such that $\Sigma_{s=1}^{N_{slices}} SCCV_s \geq CCCV$. For instance, network slices may be configured to have a minimum guaranteed number of resources such that $\Sigma_{s=1}^{N_{slices}} SCCV_{s,min}=$ CCCV but could be allowed to pull resources from other network slices if their traffic is low, up to a maximum amount of resources. In this case, one could express the value $SCCV_s$ associated to a network slice s to range in an interval $[SCCV_{s,min}, SCCV_{s,max}]$.

Embodiments for Resource Status Information Associated to Bandwidth Parts

In some aspects of embodiments, a partition of the radio cell may be represented by a bandwidth part of an uplink or a downlink carrier band. Therefore, in some aspects of embodiments, the method 300 executed by the first network node 600 may comprise:
a. computing the resource status information of a radio cell controlled by the network node 600;

b. computing the resource status information associated one or more bandwidth parts associated to the cell based on the resource status information of the radio cell; and c. transmitting a resource status update message to a second network node 510 comprising: one or more information elements characterizing the resource status information associated to the cell (i.e., cell specific information elements); and one or more corresponding information elements characterizing the resource status information associated the bandwidth parts of the cell (i.e. bandwidth part specific information elements).

Embodiments of the method 300 earlier described for partitions of the cells defined in different ways, such as coverage area of downlink reference signals beams and network slices, apply mutatis mutandis to this case.

According to other embodiments, where resource status information may comprise available capacity associated to bandwidth part of an uplink or a downlink carrier band, the method 300 executed by the first network node 600 may comprise:

determining the available capacity $C_p$ associated to $N_p \geq 2$ bandwidth parts of an uplink or a downlink carrier band, indexed by $p=1, \ldots, N_p$;

the available capacity associate to the radio cell may be computed based on a linear or non-linear combination of the available capacity $C_p$ of the $N_p$ bandwidth parts available in the cell;

transmitting a resource status update message to a second network node 510 comprising one or more information elements characterizing the available capacity associated to the radio cell.

Embodiments of the method 300 earlier described for partitions of the cells defined in different ways, such as coverage area of downlink reference signals beams and network slices, apply mutatis mutandis to this case.

Embodiments for Resource Status Information Associated to Combinations of the Above Types of Cell Partitions It is clear to the reader skilled in the art that the method 300 and embodiments apply mutatis mutandis to the case wherein a cell partition is defined by any combination of coverage area of downlink reference signals beams; network slices and bandwidth parts.

According to another aspect of the present disclosure, there is provided a method 400, performed by a UE for receiving information indicating a radio cell to connect to.

Figure 4:
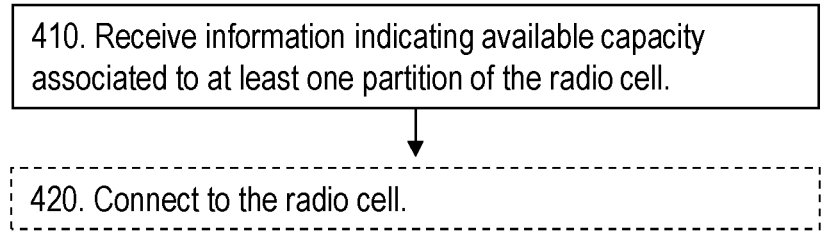
FIG. 4 is a flowchart of an example method performed by a first network node.

The method is described with reference to FIG. 4, which illustrates a flowchart of the method 400. The method 400 comprises receiving information indicating available capacity associated to at least one partition of the radio cell.

In some embodiments, the method 400 may further comprise connecting to the radio cell.

Figure 7A:
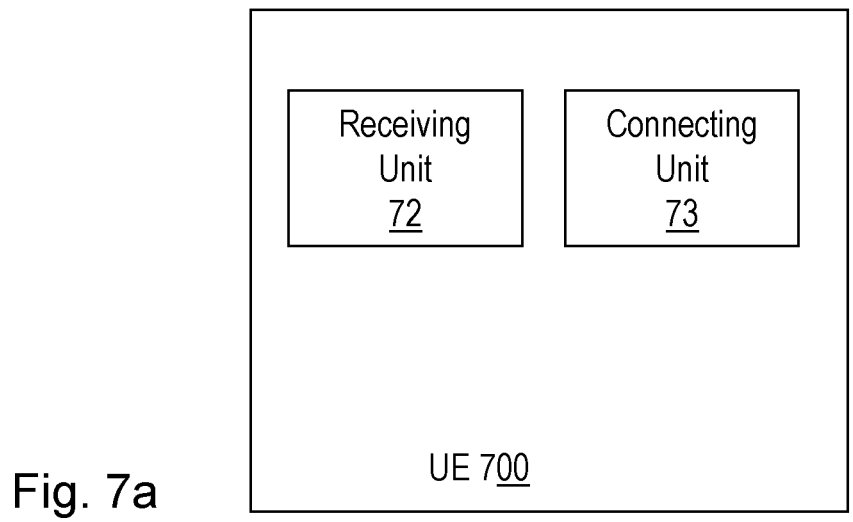
FIGS. 7a and 7b are schematic drawings illustrating an example of a user equipment.
Figure 7B:
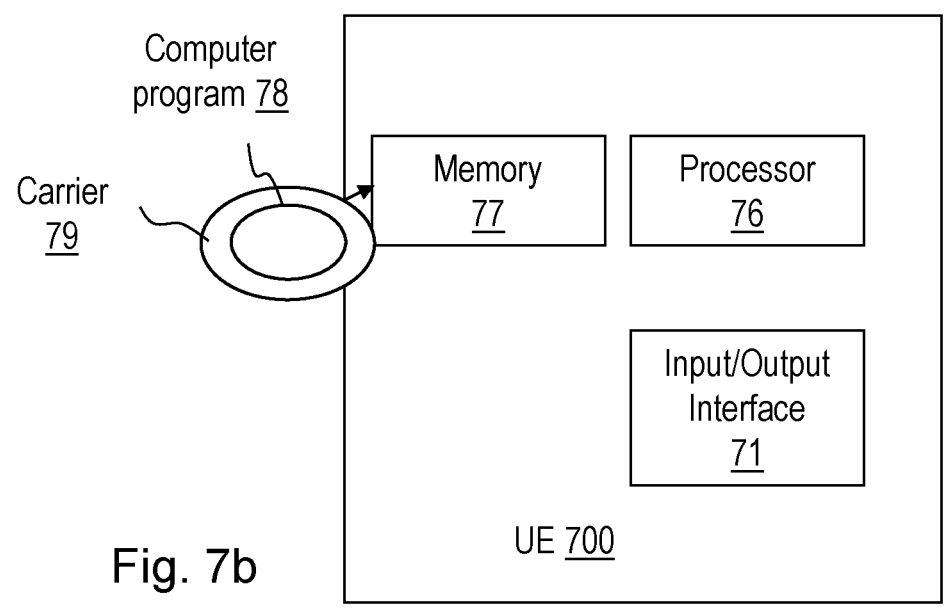

According to still another aspect, there is provided a UE 700 for performing the method 400 according to the above. The UE 700 is illustrated in FIGS. 7a and 7b. According to some embodiments, the UE 700 may comprise a receiving unit 72 and a connecting unit 73 configured to perform the method 400. According to other embodiments, the UE 700 may comprise a processor 76 and a memory 77. The memory 77 may store computer program code which, when run in the processor 76 may cause the UE 700 to perform the method 400 according to the previously presented aspect.

The UE 700 is configured to receive information indicating a radio cell to connect to. The UE 700 may be configured to receive information indicating available capacity associated to at least one partition of the radio cell.

In some embodiments, the UE 700 may further be configured to connect to the radio cell.

Figure 8:
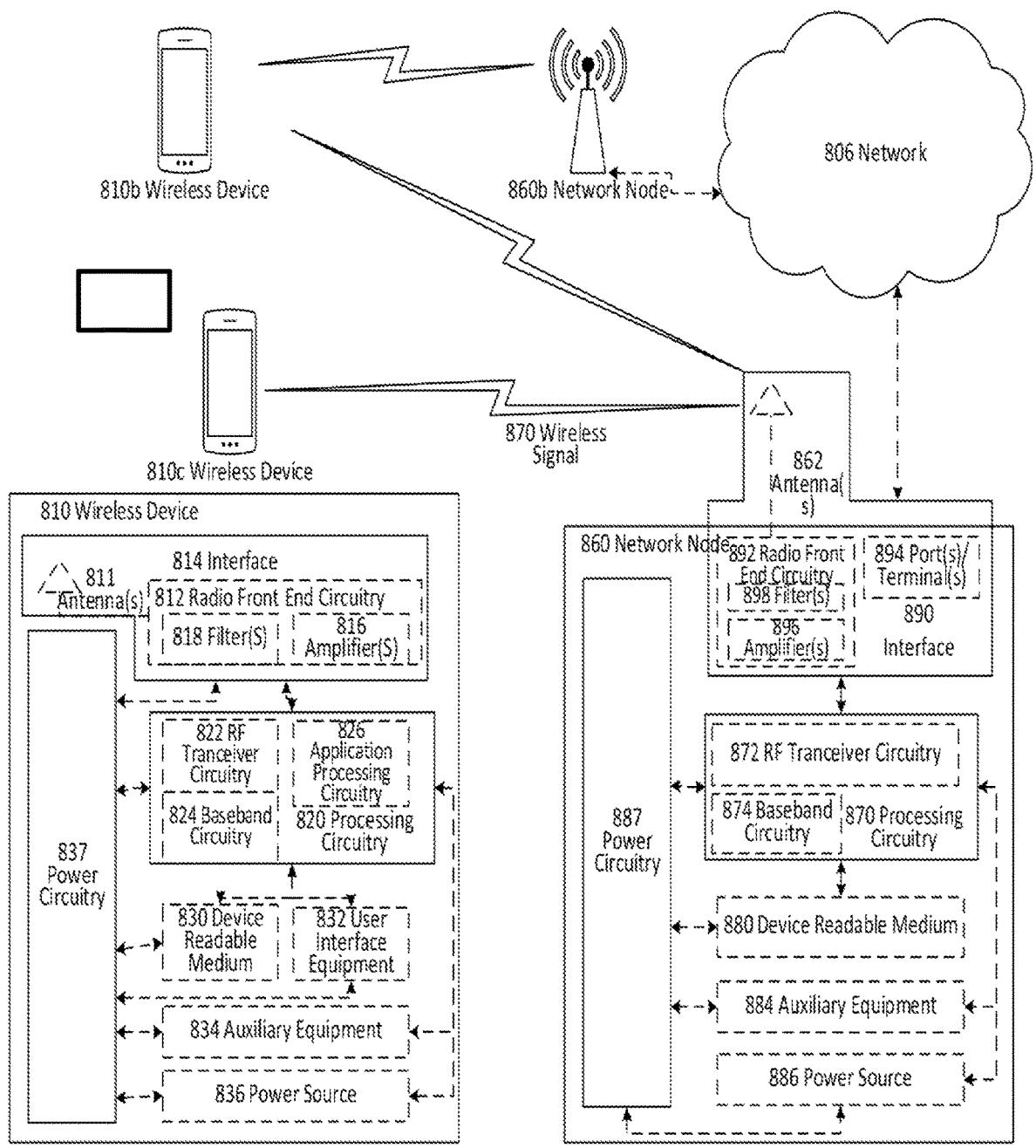
FIG. 8 illustrates an example wireless network.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
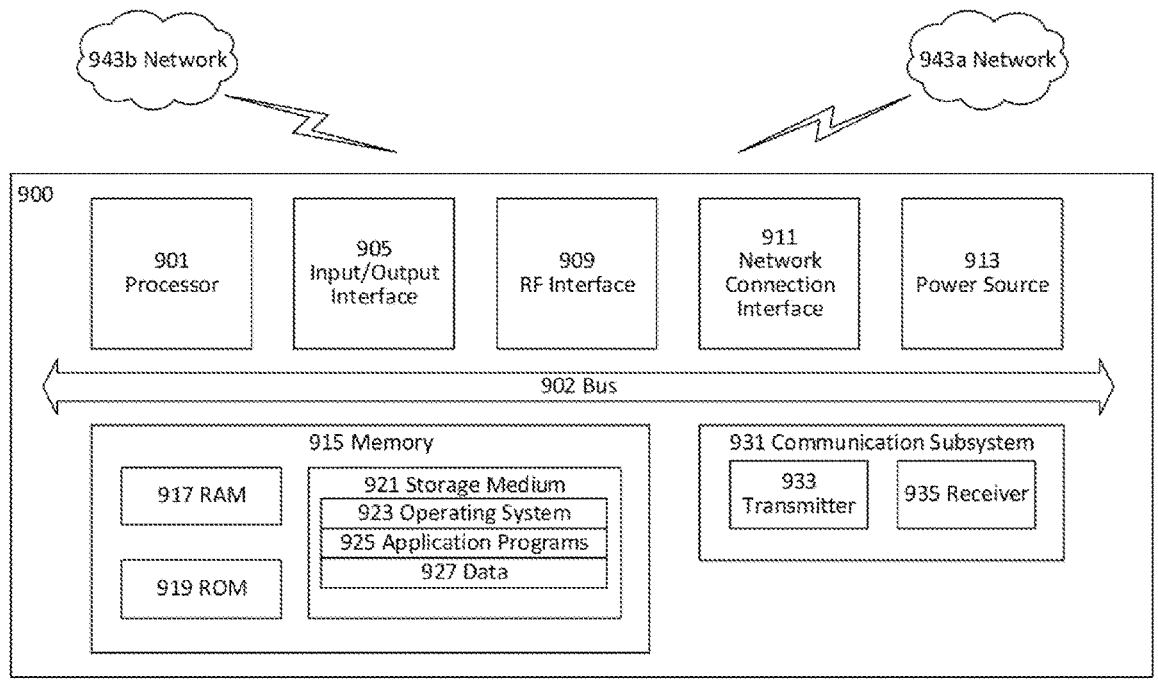
FIG. 9 shows a user equipment according to an embodiment.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 900 may be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943*a*. Network 943*a* may encompass wired and/or wireless networks such as a local-area network (LAN), a wide-area network (WAN), a computer network, a wireless network, a telecommunications network, another like network or any combination thereof. For example, network 943*a* may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943*b* using communication subsystem 931. Network 943*a* and network 943*b* may be the same network or networks or different network or networks. Communication subsystem 931 may be configured to include one or more transceivers used to communicate with network 943*b*. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943*b* may encompass wired and/or wireless networks such as a local-area network (LAN), a wide-area network (WAN), a computer network, a wireless network, a telecommunications network, another like network or any combination thereof. For example, network 943*b* may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
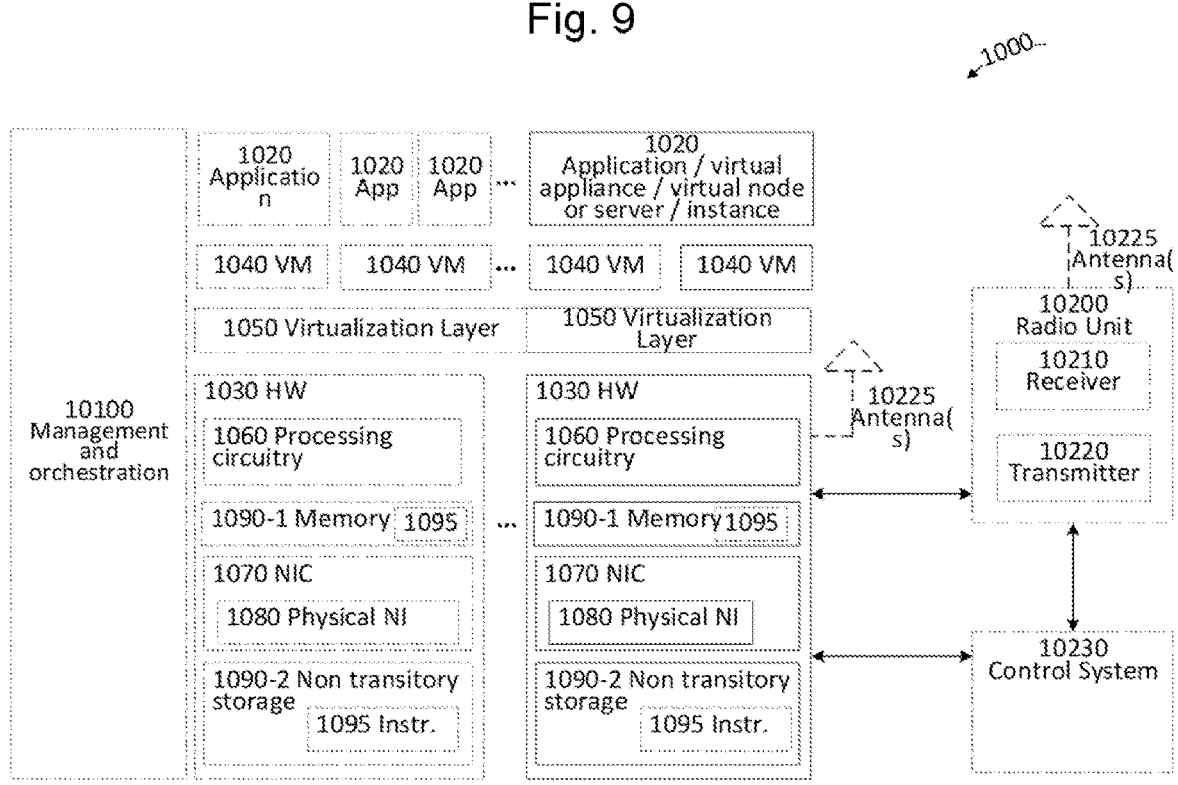
FIG. 10 shows a virtualization environment according to an embodiment.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signalling can be effected with the use of control system 10230 which may alternatively be used for communication between the hardware nodes 1030 and radio units 10200.

Figure 11:
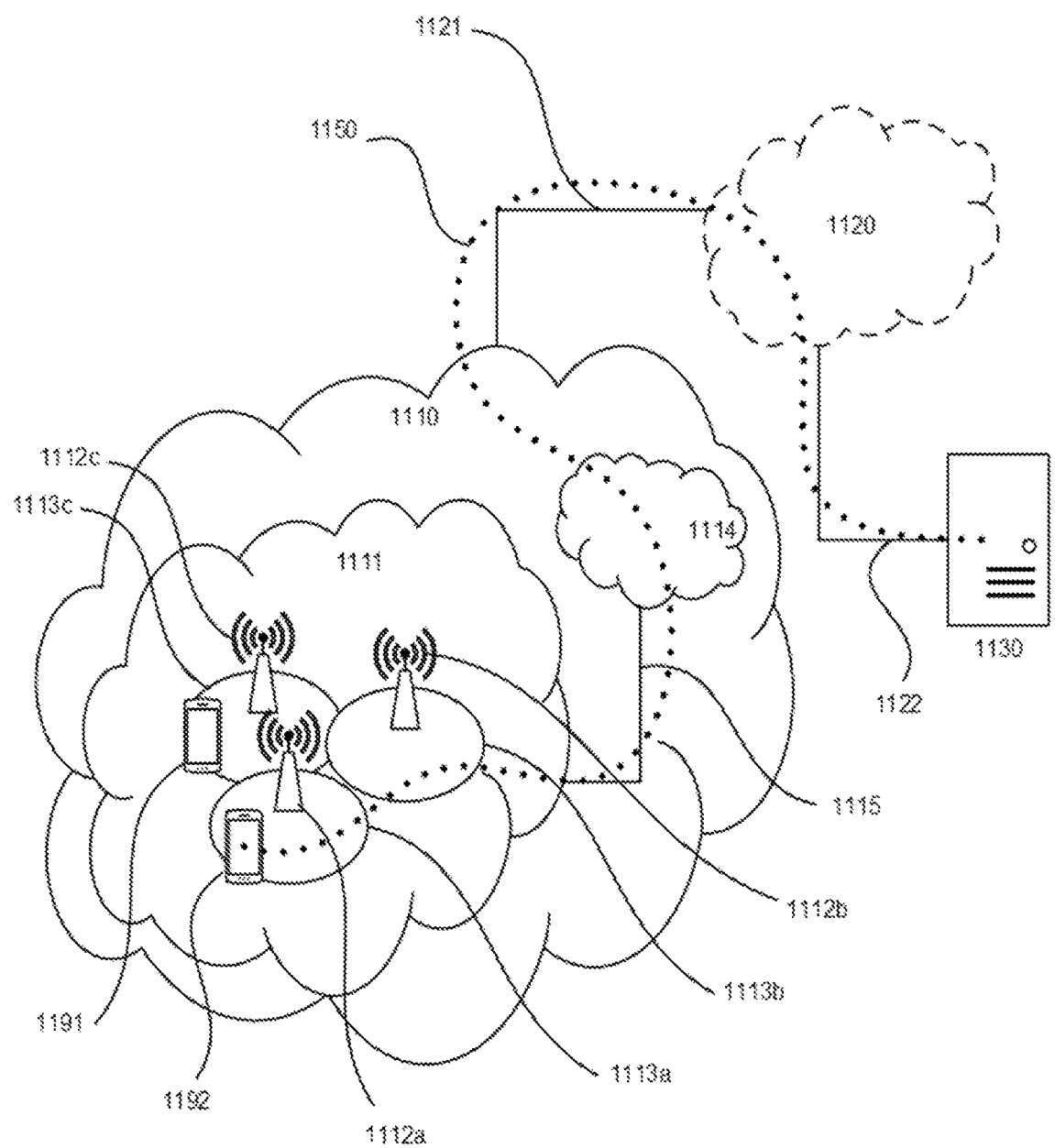
FIG. 11 illustrates an example telecommunication network connected via an intermediate network to a host computer.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

Figure 12:
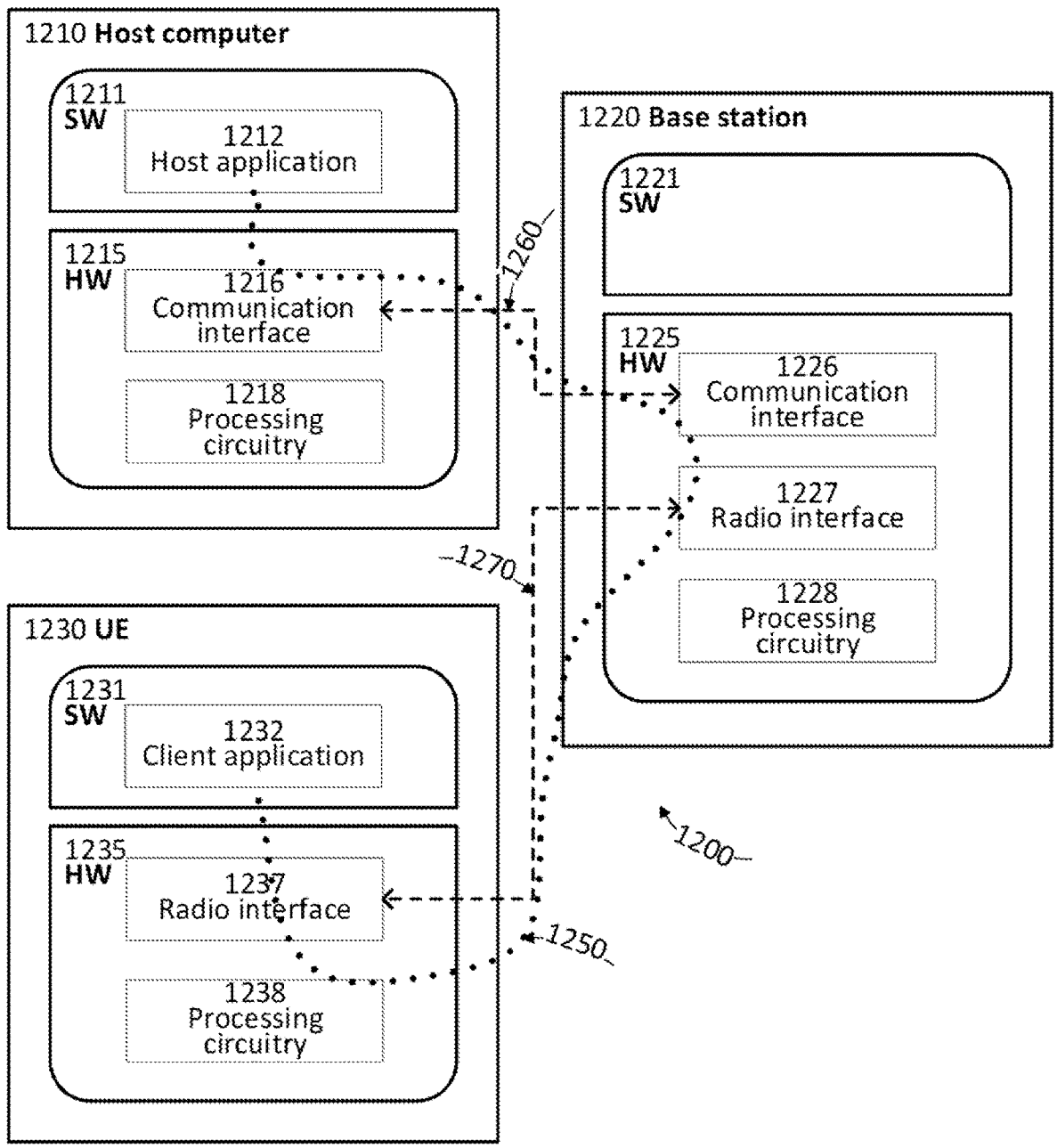
FIG. 12 shows a host computer communicating via a base station with a user equipment over a partially wireless connection according to an embodiment.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the accuracy with which available capacity may be estimated, which can improve the efficiency of load balancing and load sharing among cells and thereby provide benefits such as improved resources utilization, reduced waiting times, improved spectral efficiency and generally improved system performance.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
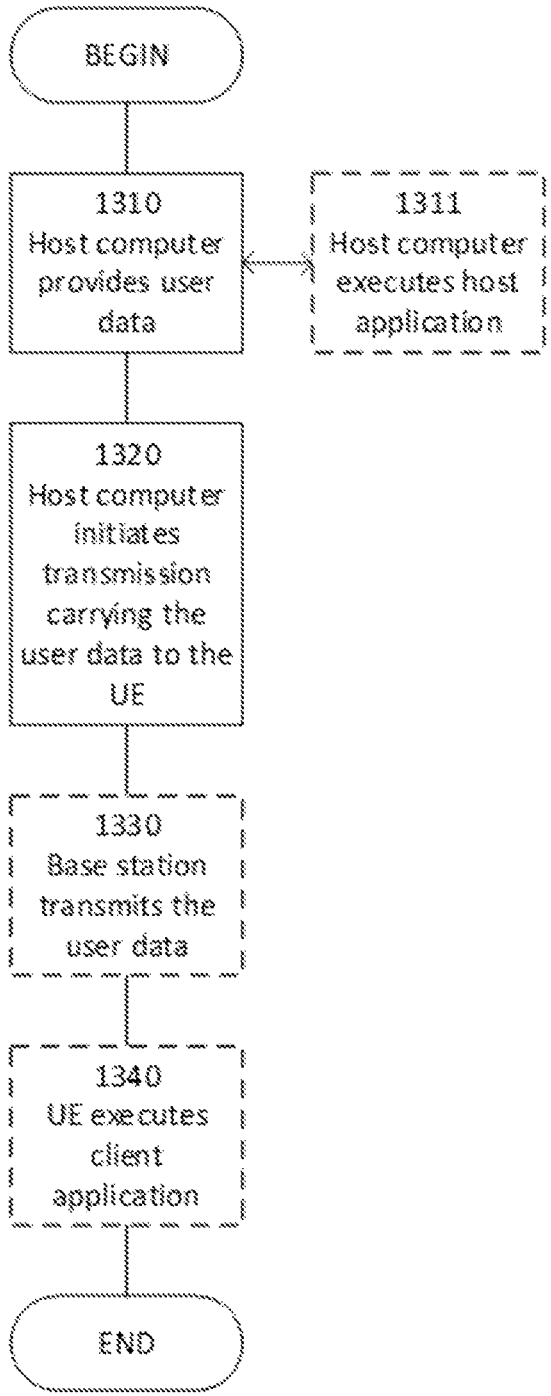
FIGS. 13 and 14 show example methods implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
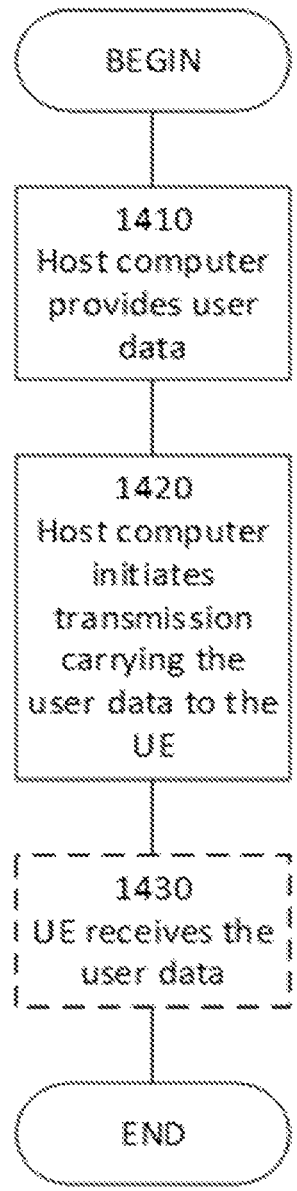

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
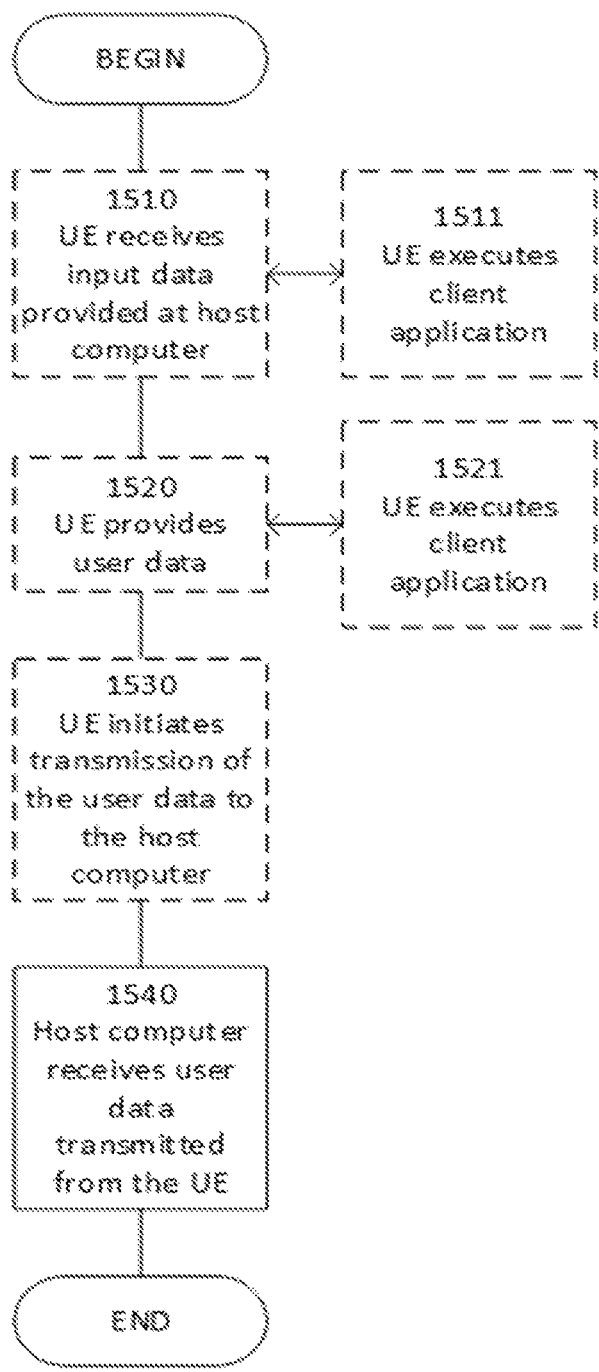
FIGS. 15 and 16 show example methods implemented in a communication system including a host computer, a base station and a user equipment.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

Figure 16:
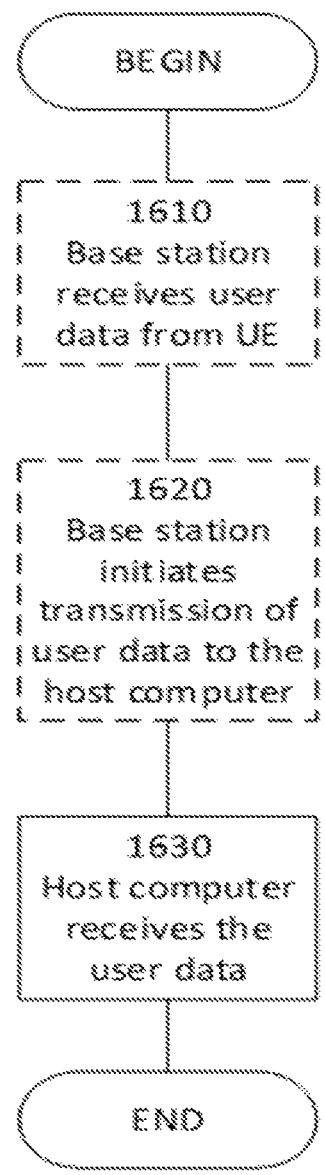

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Embodiments

Group A Embodiments

1. A method performed by a wireless device for receiving information indicating a radio cell to connect to, the method comprising:
   Receiving information indicating the available capacity associated to one or more partitions of the radio cell.
2. The method of embodiment 1, further comprising the step connecting to the radio cell.
3. The method of any of the previous embodiments, further comprising:
   providing user data; and
   forwarding the user data to a host computer via the transmission to the base station.

Group B Embodiments

4. A method performed by a base station for providing capacity information, the method comprising:
   Computing resource status information of a radio cell controlled by the base station; and
   Causing a resource status update message to be transmitted.

5. The method of embodiment 4, wherein the resource status update message is transmitted to a receiving network node.
6. The method of any of embodiments 4 and 5, wherein the resource status update message comprises one or more information elements characterizing the resource status information associated to the radio cell.
7. The method of any of embodiments 4 to 6, wherein the method further comprises:
   Computing the resource status information associated to one or more partitions of the radio cell, based on the resource status information of the radio cell.
8. The method of embodiment 7, wherein the resource status update message comprises one or more information elements characterizing the resource status information associated to one or more partitions of the radio cell.
9. The method of any of embodiments 7 and 8, wherein a partition of a radio cell comprises at least one of:
   a. The coverage area of reference signal beams;
   b. A network slice;
   c. A bandwidth part of an uplink or downlink band.
10. The method of embodiment 9, wherein the partition of a radio cell comprises a combination of at least two of:
    a. The coverage area of reference signal beams;
    b. The network slice;
    c. The bandwidth part of the uplink or downlink band.
11. The method of any of embodiments 4 to 10, wherein the resources status information comprises one or more of:
    a. Available capacity;
    b. Radio resource utilization;
    c. Transport network load capacity;
    d. Hardware load associated.
12. A method executed by a first network node the method comprising:
    a. Computing the resource status information of a radio cell controlled by the network node;
    b. Computing the resource status information associated to the coverage area of one or more downlink reference signal beams based on the resource status information of the radio cell; and
    c. Causing a resource status update message to be transmitted to a second network node comprising: one or more information elements characterizing resource status information associated to the radio cell; and one or more corresponding information elements characterizing the resource status information associated to the coverage area of one or more downlink reference signal beams.
13. The method of embodiment 12, wherein downlink reference signal beams are transmitted in a predefined spatial direction.
14. The method of embodiment 13, wherein the downlink reference signal beams comprise one or more of SSB beams and CSI-RS beams.
15. The method of any of embodiments 12 to 14, wherein the downlink reference signal beams are transmitted using MIMO spatial multiplexing techniques.
16. The method of any of embodiments 12 to 15, wherein the method comprises computing the available capacity associated to the coverage area of $N_{beams}>1$ downlink reference signal beams, indexed by $b=0,\ldots,N_{beams}-1$ wherein each downlink reference signal beam is spatially transmitted to cover a different part of the cell coverage area.

17. The method of embodiment 16, wherein each downlink reference signal beam has associated resource status information, the resource status information comprising one or more information elements in the group of:
    a. Available capacity;
    b. Radio resource utilization;
    c. Traffic load;
    d. Transport network load capacity;
    e. Hardware load associated;
18. The method of any of embodiments 12 to 17, further comprising computing for at least one downlink reference signal beam b, a coefficient $K_b$ relating an information element of the resource status information associated to the coverage area of the beam b to a corresponding information element of the resource status information of the cell.
19. The method of embodiment 18, further comprising computing the available capacity associated to the coverage area of a downlink reference signal beam $C_b$ as the sum of the available capacity of the radio cell $C_{cell}$ and the coefficient $K_b$ associated to the downlink reference signal beam b according to the formula $C_b = C_{cell} K_b$.
20. The method of embodiment 19, wherein:
    a. If $K_b=0$, the available capacity associated to the coverage area of the beam b is calculated to be the same as the available capacity of the radio cell; or
    b. If $K_b>0$, the available capacity associated to the coverage area of the beam b is calculated to be higher than the available capacity of the radio cell; or
    c. If $K_b<0$, the available capacity associated to the coverage area of the beam b is calculated to be lower than the available capacity of the radio cell.
21. The method of embodiment 18, further comprising computing the available capacity associated to the coverage area of a downlink reference signal beam $C_b$ as the product of the available capacity of the radio cell $C_{cell}$ and the coefficient $K_b$ associated to the downlink reference signal beam b according to the formula $C_b = C_{cell} \cdot K_b$.
22. The method of embodiment 21, wherein:
    a. If $K_b=1$, the available capacity associated to the coverage area of the beam b is calculated to be the same as the available capacity of the radio cell; or
    b. If $K_b>1$, the available capacity associated to the coverage area of the beam b is calculated to be higher than the available capacity of the radio cell; or
    c. If $K_b<1$, the available capacity associated to the coverage area of the beam b is calculated to be lower than the available capacity of the radio cell.
23. The method of embodiment 18, wherein the available capacity of the cell is calculated using the composite available capacity, CAC, according to the formula CAC=CCCV·CV, where CCCV is the cell capacity class value and CV is the capacity value.
24. The method of embodiment 23, wherein the available capacity associated to the coverage area of a downlink reference signal beam $C_b$ is calculated according to at least one of the following formulae:
    a. $C_b = CAC + K_b$;
    b. $C_b = CCCV + K_b$;
    c. $C_b = CV + K_b$;
    d. $C_b = CAC \cdot K_b$;
    e. $C_b = CCCV \cdot K_b$; and
    f. $C_b \times CV \cdot K_b$.
25. The method of any of embodiments 12 to 24, wherein the radio cell is partitioned by network slices instead of coverage areas of downlink reference signal beams, such that each reference to a downlink reference signal beam is replaced by an equivalent reference to a network slice.
26. The method of any of embodiments 12 to 24, wherein the radio cell is partitioned by bandwidth parts instead of coverage areas of downlink reference signal beams, such that each reference to a downlink reference signal beam is replaced by an equivalent reference to a bandwidth part.
27. A method executed by a first network node the method comprising:
    a. Computing the resource status information associated to a radio cell controlled by the first network node;
    b. Computing the resources status associated to one or more network slices available in the cell based on the resource status information of the radio cell; and
    c. Causing a resource status update message to be transmitted to a second network node comprising: one or more information elements characterizing the resource status information associated to the cell; and one or more corresponding information elements characterizing the resource status information associated to one or more network slices available in the cell.
28. A method executed by a first network node the method comprising:
    a. Computing the resource status information associated to a radio cell controlled by the first network node;
    b. Computing the resource status information associated to one or more bandwidth parts associated to the cell based on the resource status information of the radio cell; and
    c. Causing a resource status update message to be transmitted to a second network node: one or more information elements characterizing the resource status information associated to the cell; and one or more corresponding information elements characterizing the resource status information associated to one or more bandwidth parts associated to the cell.
29. The method of any of the previous embodiments, further comprising:
    obtaining user data; and
    forwarding the user data to a host computer or a wireless device.

Group C Embodiments

30. A wireless device for receivingreceiving information indicating a radio cell to connect to, the wireless device comprising:
    processing circuitry configured to perform any of the steps of any of the Group A embodiments; and
    power supply circuitry configured to supply power to the wireless device.
31. A base station for providing capacity information, the base station comprising:
    processing circuitry configured to perform any of the steps of any of the Group B embodiments;
    power supply circuitry configured to supply power to the base station.

32. A user equipment (UE) for receiving capacity information, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   battery connected to the processing circuitry and configured to supply power to the UE.

33. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.

34. The communication system of the previous embodiment further including the base station.

35. The communication system of the previous 2 embodiments, further including the UE, wherein the UE is configured to communicate with the base station.

36. The communication system of the previous 3 embodiments, wherein:
   the processing circuitry of the host computer is configured to execute a host application, thereby providing the user data; and
   the UE comprises processing circuitry configured to execute a client application associated with the host application.

37. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.

38. The method of the previous embodiment, further comprising, at the base station, transmitting the user data.

39. The method of the previous 2 embodiments, wherein the user data is provided at the host computer by executing a host application, the method further comprising, at the UE, executing a client application associated with the host application.

40. A user equipment (UE) configured to communicate with a base station, the UE comprising a radio interface and processing circuitry configured to performs the of the previous 3 embodiments.

41. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.

42. The communication system of the previous embodiment, wherein the cellular network further includes a base station configured to communicate with the UE.

43. The communication system of the previous 2 embodiments, wherein:
   the processing circuitry of the host computer is configured to execute a host application, thereby providing the user data; and
   the UE's processing circuitry is configured to execute a client application associated with the host application.

44. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.

45. The method of the previous embodiment, further comprising at the UE, receiving the user data from the base station.

46. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.

47. The communication system of the previous embodiment, further including the UE.

48. The communication system of the previous 2 embodiments, further including the base station, wherein the base station comprises a radio interface configured to communicate with the UE and a communication interface configured to forward to the host computer the user data carried by a transmission from the UE to the base station.

49. The communication system of the previous 3 embodiments, wherein:
   the processing circuitry of the host computer is configured to execute a host application; and
   the UE's processing circuitry is configured to execute a client application associated with the host application, thereby providing the user data.

50. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.

51. A method implemented in a communication system including a host computer, a base station and a user equipment (UE), the method comprising:
   at the host computer, receiving user data transmitted to the base station from the UE, wherein the UE performs any of the steps of any of the Group A embodiments.
52. The method of the previous embodiment, further comprising, at the UE, providing the user data to the base station.
53. The method of the previous 2 embodiments, further comprising:
   at the UE, executing a client application, thereby providing the user data to be transmitted; and
   at the host computer, executing a host application associated with the client application.
54. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
55. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
56. The communication system of the previous embodiment further including the base station.
57. The communication system of the previous 2 embodiments, further including the UE, wherein the UE is configured to communicate with the base station.
58. The communication system of the previous 3 embodiments, wherein:
   the processing circuitry of the host computer is configured to execute a host application;
   the UE is configured to execute a client application associated with the host application, thereby providing the user data to be received by the host computer.
59. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.
60. The method of the previous embodiment, further comprising at the base station, receiving the user data from the UE.
61. The method of the previous 2 embodiments, further comprising at the base station, initiating a transmission of the received user data to the host computer.

REFERENCES

3GPP TS 32.522 v.11.7.0
3GPP TS 36.331 v 15.7.0
3GPP TS 36.423 v 15.7.0

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method, performed by a first network node, for providing resource status information to a second network node, wherein the first network node controls a radio cell comprising a plurality of partitions, the method comprising:
determining a resource status information based on a ratio between a resource status associated to the radio cell and a resource status associated to at least one partition of the radio cell, wherein the at least one cell partition comprises at least one of a coverage area of reference signal beams and a bandwidth part of an uplink or downlink band;
transmitting, to the second network node, a resource status update message comprising at least one information element comprising the determined resource status information.

2. The method of claim 1, wherein the resources status information comprises at least one of: available capacity; radio resource utilization; transport network load capacity; and hardware load.

3. The method of claim 1, wherein the step of determining resource status information comprises:
determining resource status information associated to the radio cell controlled by the first network node; and
determining resource status information associated to at least one partition of the radio cell based on the determined resource status information associated to the radio cell.

4. The method of claim 3, wherein the step of determining resource status information associated to at least one partition of the radio cell further comprises determining, for at least one cell partition b, a coefficient $K_b$ relating an information element of the resource status information associated to the cell partition b to a corresponding information element of the resource status information associated to the radio cell.

5. The method of claim 4, wherein the resources status information associated to the cell partition $C_b$ is determined according to one of:
a sum of the resources status information associated to the radio cell $C_{cell}$ and the coefficient $K_b$ associated to the cell partition b according to the formula $C_b = C_{cell} + K_b$;
a product of the resources status information associated to the radio cell $C_{cell}$ and the coefficient $K_b$ associated to the cell partition b according to the formula $C_b = C_{cell} \cdot K_b$; and
using a Composite Available Capacity (CAC) according to a product of a Cell Capacity Class Value (CCCV) and a Capacity Value (CV), according to the formula $CAC = CCCV \cdot CV$, and wherein the resources status information associated to the cell partition $C_b$ is calculated according to one of the following formulae:
$C_b = CAC + K_b$; $C_b = CCCV + K_b$; $C_b = CV + K_b$; $C_b = CAC \cdot K_b$; $C_b = CCCV \cdot K_b$; and $C_b = CV \cdot K_b$.

6. The method of claim 1, wherein the step of determining resource status information comprises:
determining resource status information associated to at least one partition of the radio cell controlled by the first network node; and
determining resource status information associated to the radio cell based on a linear or non-linear combination of the determined resource status information associated to the at least one partition of the radio cell.

7. The method of claim 6, wherein the step of determining resource status information associated the radio cell further comprising associating a weight $w_b$ to the resources status information $C_b$ or the bth cell partition.

8. The method of claim 7, wherein the resources status information associated to the radio cell comprising N cell partitions, wherein $N \geq 2$, is determined according to one of:
- a weighted average of the resource status information $C_b$ associated to the N cell partitions according to the formula $C_{cell} = \Sigma_{b=1}^{N} w_b C_b$; and
- a weighted average of a non-linear function $f_b(\cdot)$ of resource status information $C_b$ associated to the N cell partitions according to the formula $C_{cell} = \Sigma_{b=1}^{N} w_b f_b(C_b)$.

9. The method of claim 6, wherein the resources status information associated to the radio cell comprising N cell partitions, wherein $N \geq 2$, is determined according to one of:
- a measure of a variance and/or standard deviation associated to a set of capacities $\{C_b\}_{b=1}^{N_{beams}}$ corresponding to the coverage area of the $N_{beams}$ downlink reference signal beams;
- a minimum resources status information among the resources status information $C_b$ associated to the N cell partitions according to the formula $$C_{cell} = \min_{b=1,\ldots,N} C_b;$$

- a maximum resources status information among the resources status information $C_b$ associated to the N cell partitions according to the formula $$C_{cell} = \max_{b=1,\ldots,N} C_b;$$

and
- a product of a Beam Capacity Class Value, BCCV, and a Beam Capacity Value, BCV, according to the formula $C_b = BCCV_b \cdot BCV_b$, $b=1, \ldots, N$.

10. The method of claim 1, wherein the at least one cell partition of the radio cell controlled by the first network node comprises the coverage area of downlink reference signal beams and the downlink reference signal beams are transmitted in a predefined spatial direction.

11. The method of claim 10, wherein the downlink reference signal beams comprise at least one of Synchronization Signals and PBCH Blocks (SSB) beams and Channel State Information Reference Signal (CSI-RS) beams.

12. A method performed by a User Equipment (UE) for receiving information indicating a radio cell to connect to, the method comprising:
- receiving information indicating available capacity associated to at least one partition of the radio cell, wherein the at least one cell partition comprises at least one of a coverage area of reference signal beams and a bandwidth part of an uplink or downlink band.

13. The method of claim 12, wherein the method further comprises:
- connecting to the radio cell.

14. A first network node for providing resource status information to a second network node, wherein the first network node controls a radio cell comprising a plurality of partitions, wherein the first network node comprises interface circuitry configured to communicate with one or more other network nodes and processing circuitry operatively coupled to the interface circuitry and configured to:
- determine a resource status information based on a ratio between a resource status associated to the radio cell and a resource status associated to at least one partition of the radio cell, wherein the at least one cell partition comprises at least one of a coverage area of reference signal beams and a bandwidth part of an uplink or downlink band;
- transmit, to the second network node, a resource status update message comprising at least one information element comprising the determined resource status information.

15. A User Equipment (UE) for receiving information indicating a radio cell to connect to, the UE comprising radio circuitry configured to communicate with the radio cell and processing circuitry operatively coupled to the radio circuitry and configured to:
- receive information indicating available capacity associated to at least one partition of the radio cell, wherein the at least one cell partition comprises at least one of a coverage area of reference signal beams and a bandwidth part of an uplink or downlink band.

16. The UE of claim 15, wherein the processing circuitry further is configured to:
- connect to the radio cell.

* * * * *